Figure 1:
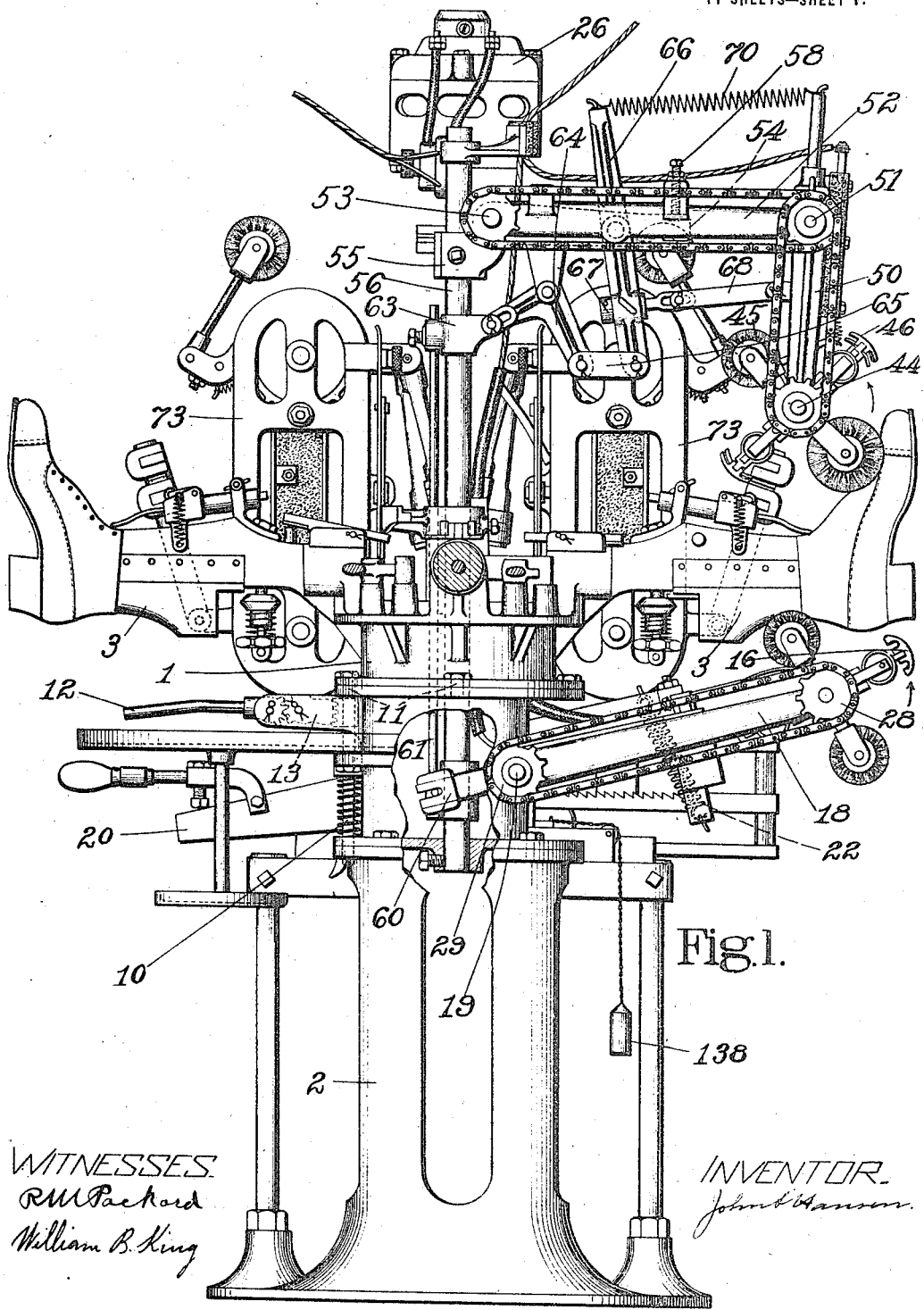

J. S. HANSEN.
MACHINE FOR IRONING OR TREEING BOOTS OR SHOES.
APPLICATION FILED SEPT. 14, 1914.

1,268,837.

Patented June 11, 1918.
11 SHEETS—SHEET 5.

WITNESSES:
R M Packard
William B. King.

INVENTOR
John S Hansen.

J. S. HANSEN.
MACHINE FOR IRONING OR TREEING BOOTS OR SHOES.
APPLICATION FILED SEPT. 14, 1914.

J. S. HANSEN.
MACHINE FOR IRONING OR TREEING BOOTS OR SHOES.
APPLICATION FILED SEPT. 14, 1914.

1,268,837.

Patented June 11, 1918.
11 SHEETS—SHEET 10.

WITNESSES.
R M Packard
William B. King

INVENTOR.
John S Hansen

J. S. HANSEN.
MACHINE FOR IRONING OR TREEING BOOTS OR SHOES.
APPLICATION FILED SEPT. 14, 1914.

1,268,837.

Patented June 11, 1918.
11 SHEETS—SHEET 11.

WITNESSES.

INVENTOR.

UNITED STATES PATENT OFFICE.

JOHN S. HANSEN, OF BROCKTON, MASSACHUSETTS, ASSIGNOR TO O. A. MILLER TREEING MACHINE COMPANY, OF PORTLAND, MAINE, A CORPORATION OF MAINE.

MACHINE FOR IRONING OR TREEING BOOTS OR SHOES.

1,268,837.

Specification of Letters Patent.

Patented June 11, 1918.

Application filed September 14, 1914. Serial No. 861,585.

*To all whom it may concern:*

Be it known that I, JOHN S. HANSEN, a citizen of the United States, residing at Brockton, in the county of Plymouth and State of Massachusetts, have invented certain Improvements in Machines for Ironing or Treeing Boots or Shoes, of which the following description, in connection with the accompanying drawings, is a specification, like reference characters on the drawings indicating like parts in the several figures.

This invention relates to machines for performing finishing operations on boots and shoes, and more particularly to machines for use in performing ironing, treeing or cleaning operations thereon.

After the making operations on a shoe have been completed it is necessary to smooth out the wrinkles in the upper of the shoe preparatory to the final dressing operation and to packing the shoe for shipment. On the better grades of shoes this treeing or ironing operation is performed almost universally by hand. For this purpose the shoe is mounted on an expansible tree that completely fills its interior and stretches the leather tightly, and the upper is then rubbed to smooth out the wrinkles by means of tools such as "treeing irons", which usually are heated. At this time also the upper of the shoe is cleaned, and frequently this operation requires as much time as that of treeing or ironing the shoe. After these operations have been completed, the shoe is given one or more coats of dressing and then is ready to be packed.

While automatic machines are used to some extent for treeing or ironing the cheaper grades of shoes, such machines have never been found satisfactory on the better grades of shoes for the reasons, among others, that these machines are so constructed that they do not iron satisfactorily certain parts of the shoe, particularly the shank portions and the top of the vamp or instep, and they are not constructed to clean the shoe. Consequently the operation of the machine must be supplemented by so much hand labor in cleaning the shoe and in ironing those parts that have not been treated by the machine, that it is found more economical and more satisfactory to perform the entire ironing operation by hand. A further objection to the use of these machines on fine shoes is the fact that great care is required to prevent the tools from burning the shoe. In the automatic machines the ironing tools are reciprocated longitudinally of the shoe, the direction of movement of the tools being reversed while they are in contact with the shoe, and if the irons are heated to the temperature necessary to enable them to smooth the stock satisfactorily, they are very likely to burn the stock at the point where their movement is reversed. This, of course, is due to the fact that there is a momentary pause in the movement of the tools at this point.

The present invention has for its chief object to devise a machine in which the defects just mentioned shall be avoided and which will be capable of performing the ironing and cleaning operations on a shoe more rapidly and at least as satisfactorily as they can be performed by hand. In carrying out this object the invention provides, as one important feature, ironing means comprising one or more heated ironing tools and means for effecting relative movement of the tool or tools and a shoe in such manner as to cause the tool or tools to traverse the shoe without stopping while in contact with the shoe. In the construction shown each tool is moved bodily in a closed path in such relation to the shoe as to traverse the shoe a plurality of times successively in the same direction, after which a relative separating movement of the tool and the shoe is effected without interrupting said bodily movement of the tool. In this manner any pause of the tool in contact with the work, such as might tend to injure the work, is entirely avoided.

Another important feature of the invention consists in improved means for insuring effective treatment of that portion of the side of a shoe which is adjacent to the crease between the upper and the sole, this crease being hereinafter termed, for convenience, the rand crease. In constructions heretofore proposed an attempt has been made to direct the movement of the side ironing tools, as by means of a cam, in such manner as to cause the tools to follow a path approximating in some degree the curve of the rand crease with reference to the plane of support of the shoe bottom. Such cams, however, have been shaped only to approximate an average of the curves of a plurality of styles of shoes, and consequently have not been such as to cause the tools to follow accurately the curve of the rand crease in any particular shoe. No attempt, moreover, has been made, as far as I am aware, to direct the movement of the tools that operate at opposite sides of a shoe in different paths corresponding to the differences in the curve of the crease at the opposite sides, the tools having been moved in the same path irrespective of whether a right or a left shoe was presented for treatment. This invention insures more accurate and effective treatment of the work than heretofore through provision for movements of the tools in different paths for different styles of shoes and through provision for movements of the tools at the opposite sides of a shoe in different paths determined in accordance with differences in the curve of the crease at the opposite sides of a shoe. In the construction shown the path of movement of the tool or tools at one side of the shoe is determined as an incident to the relative movement of the tools and the shoe into operative working relation, in order to insure effective treatment of both sides of the shoe whether the shoe be a right or a left.

A further feature of the invention consists in a novel combination and arrangement of tools for operating respectively upon the sides, the top of the forepart, and the back of a shoe to insure effective treatment of the different portions of the shoe without danger of interference of the different tools with one another.

Still other features of the invention reside in novel means for cleaning the shoe, for controlling the operations of the different tools upon the shoe, and for subjecting the ironing tools to a definite and uniform degree of heat. These and other features of the invention, together with various details of construction and combinations of parts, will now be described with reference to the accompanying drawings, which show an illustrative embodiment of the invention, and will be pointed out in the claims.

Figure 2:
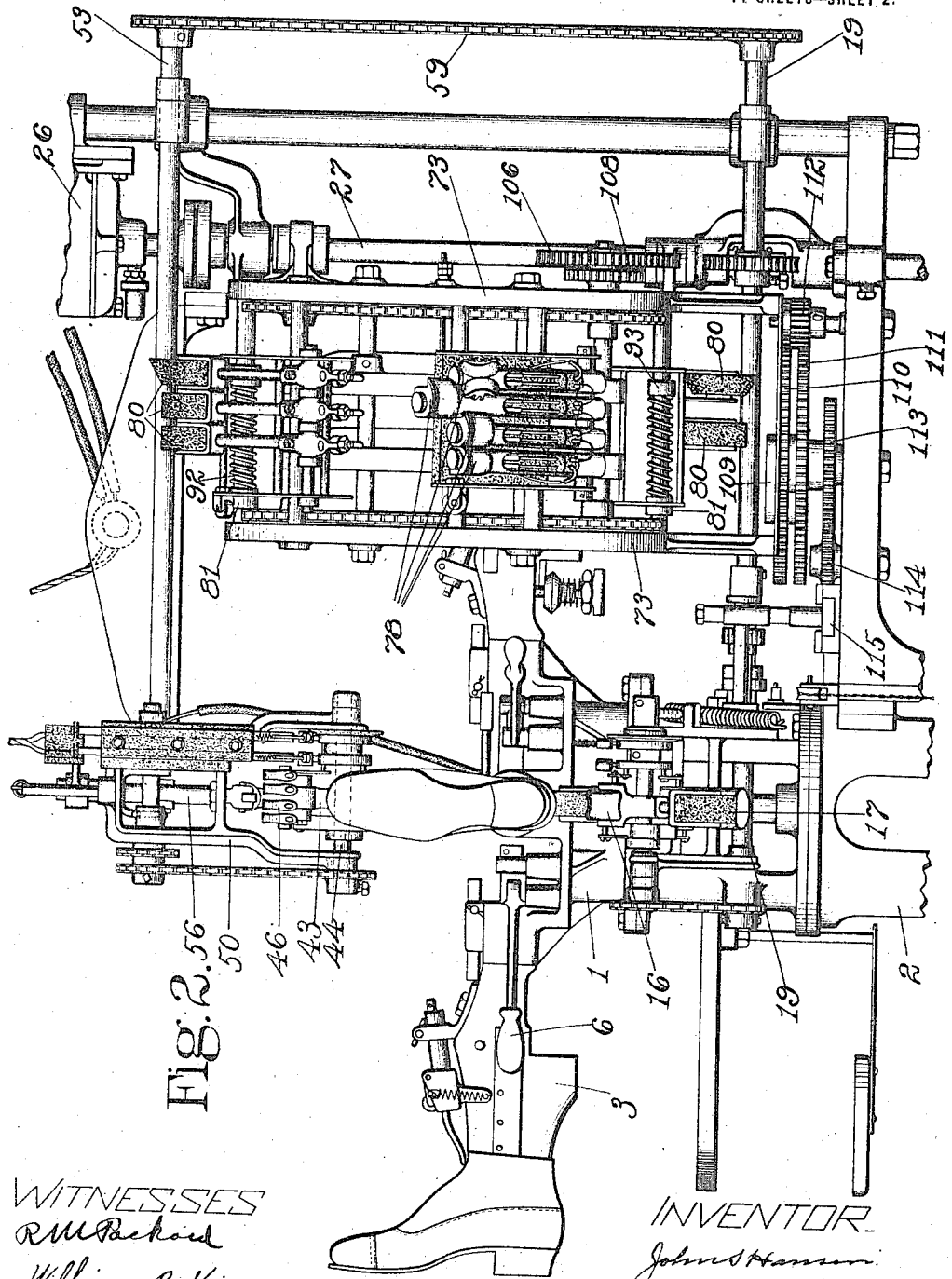
Figure 3:
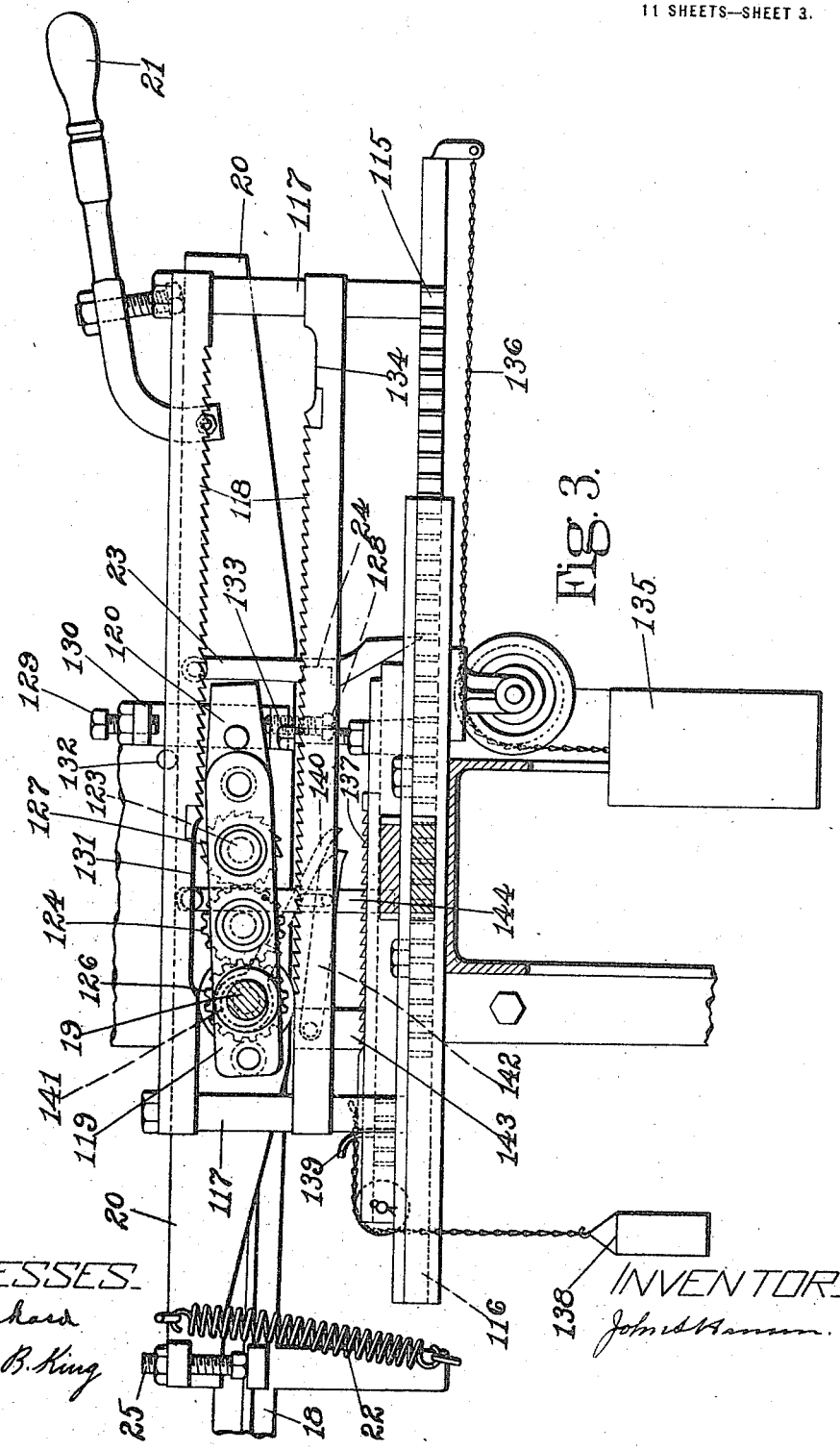
Figure 4:
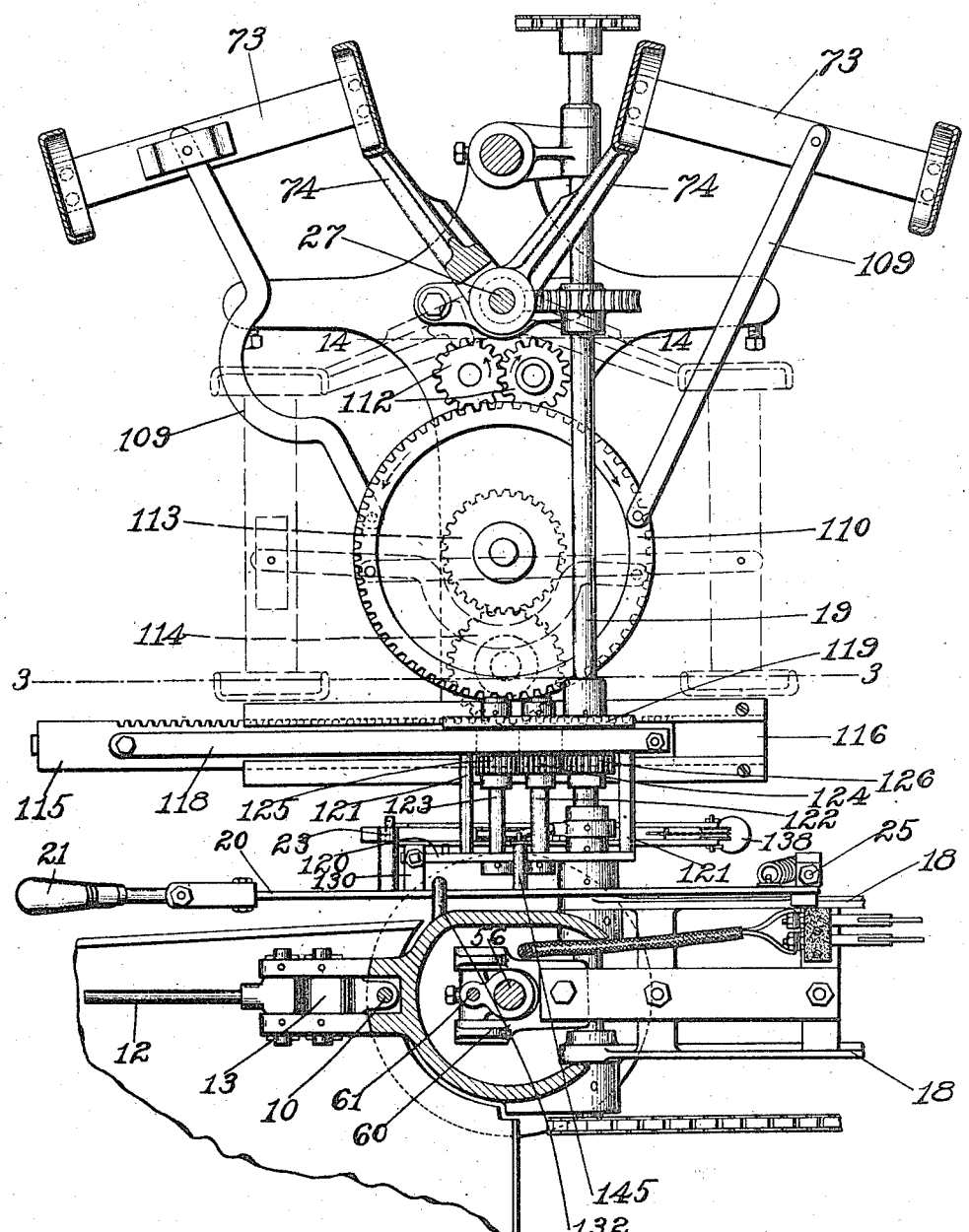
Figure 5:
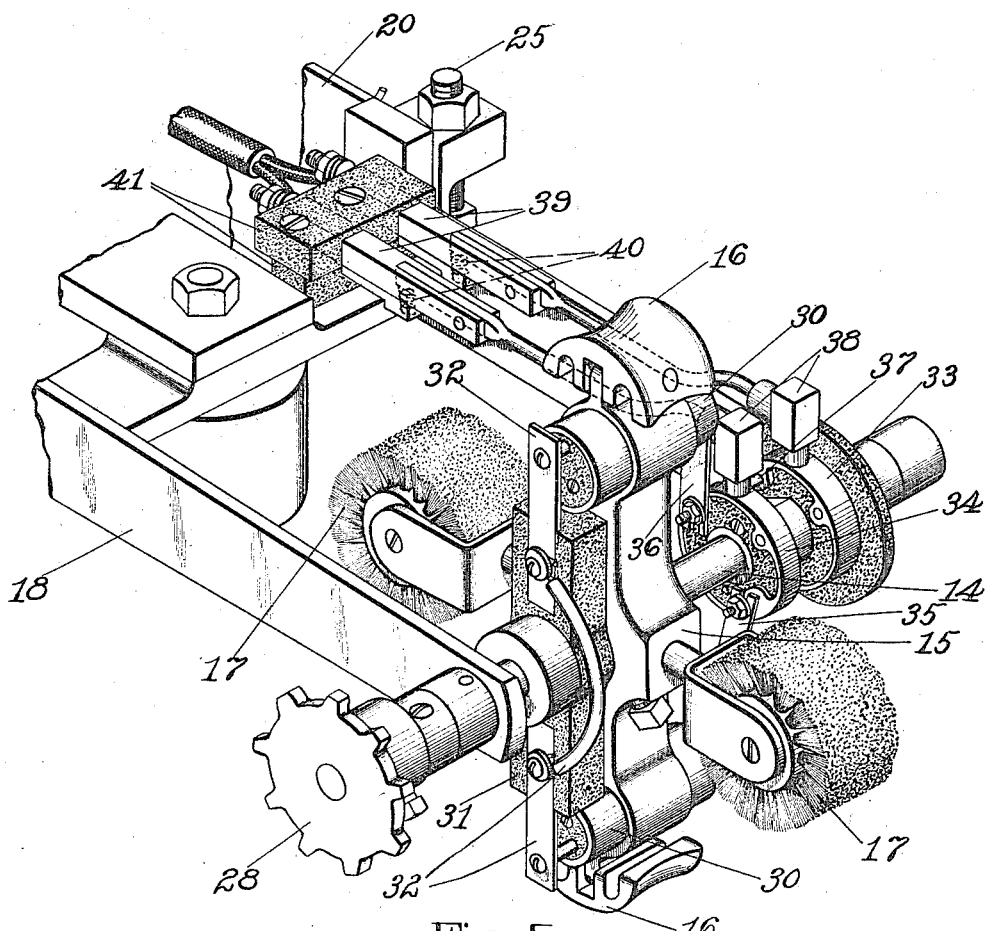
Figure 6:
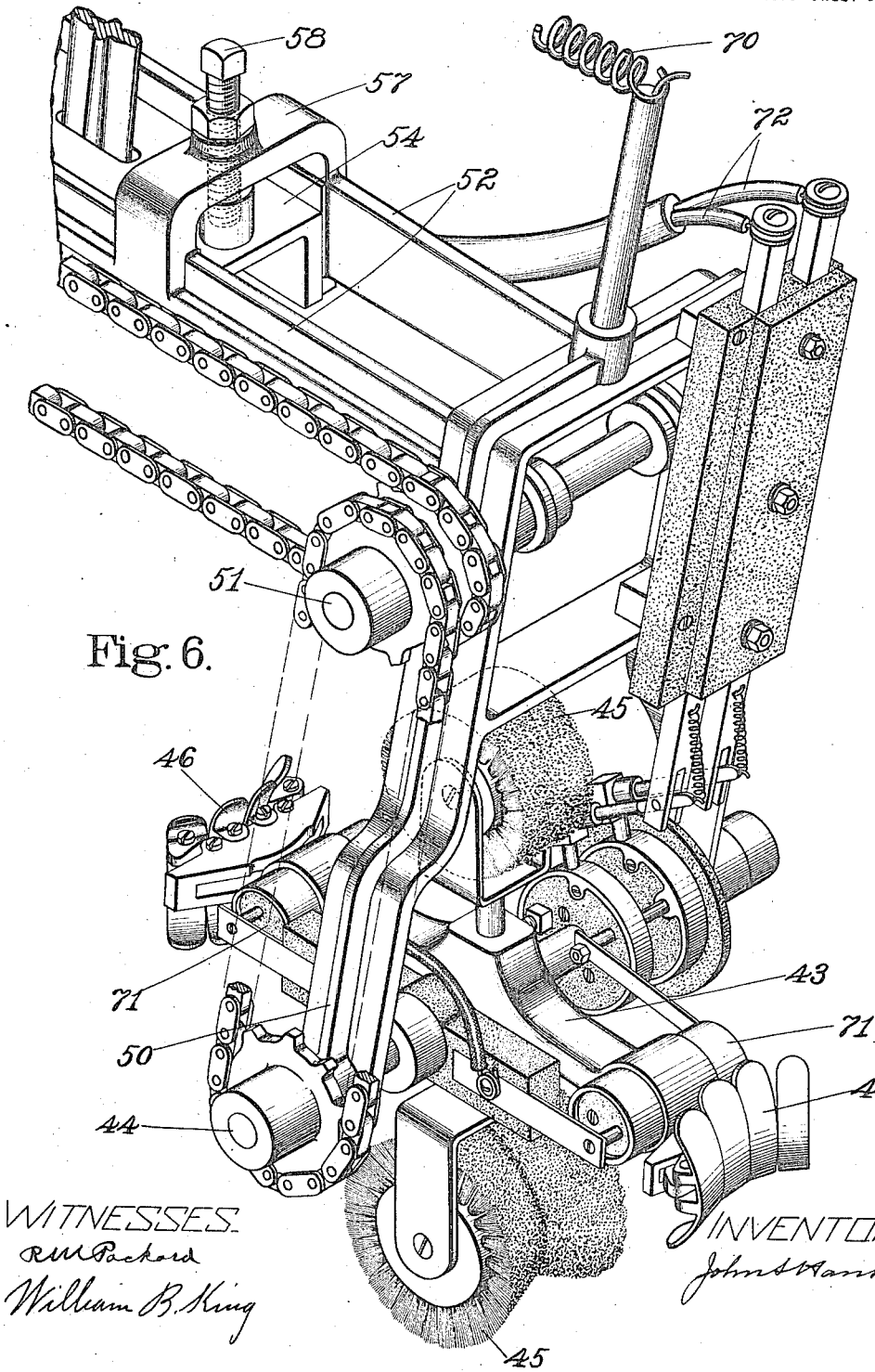
Figure 7:
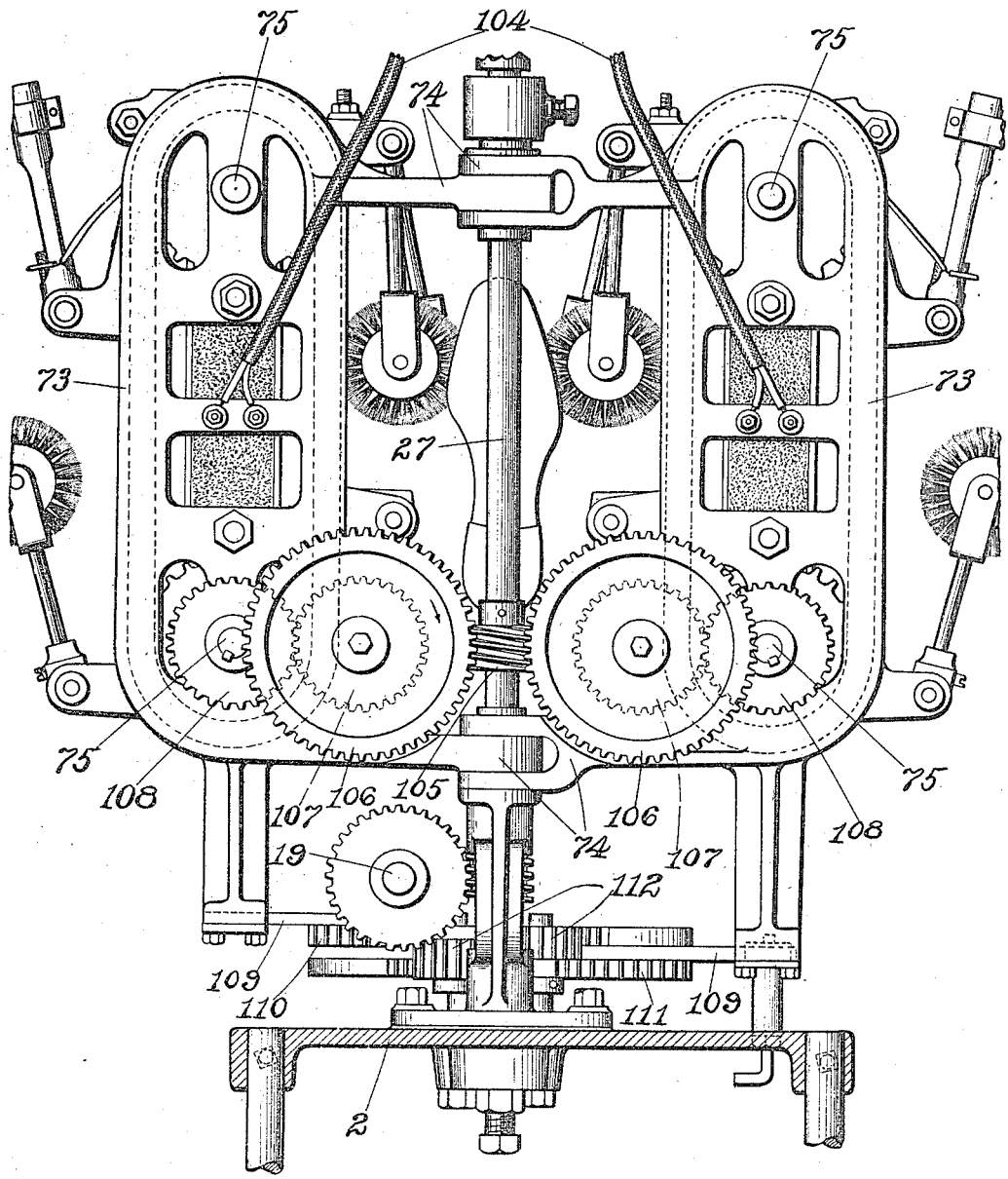
Figure 8:
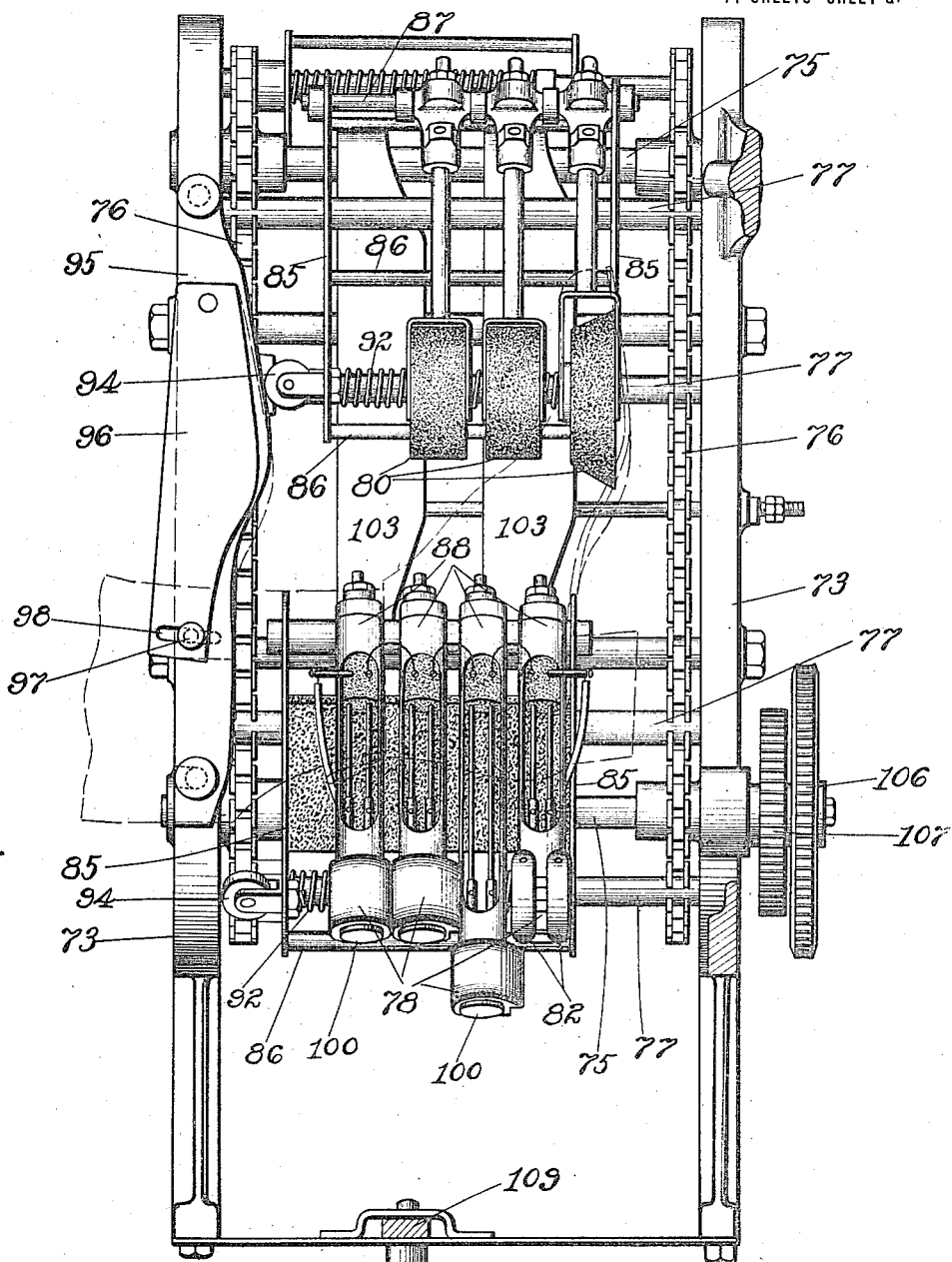
Figure 9:
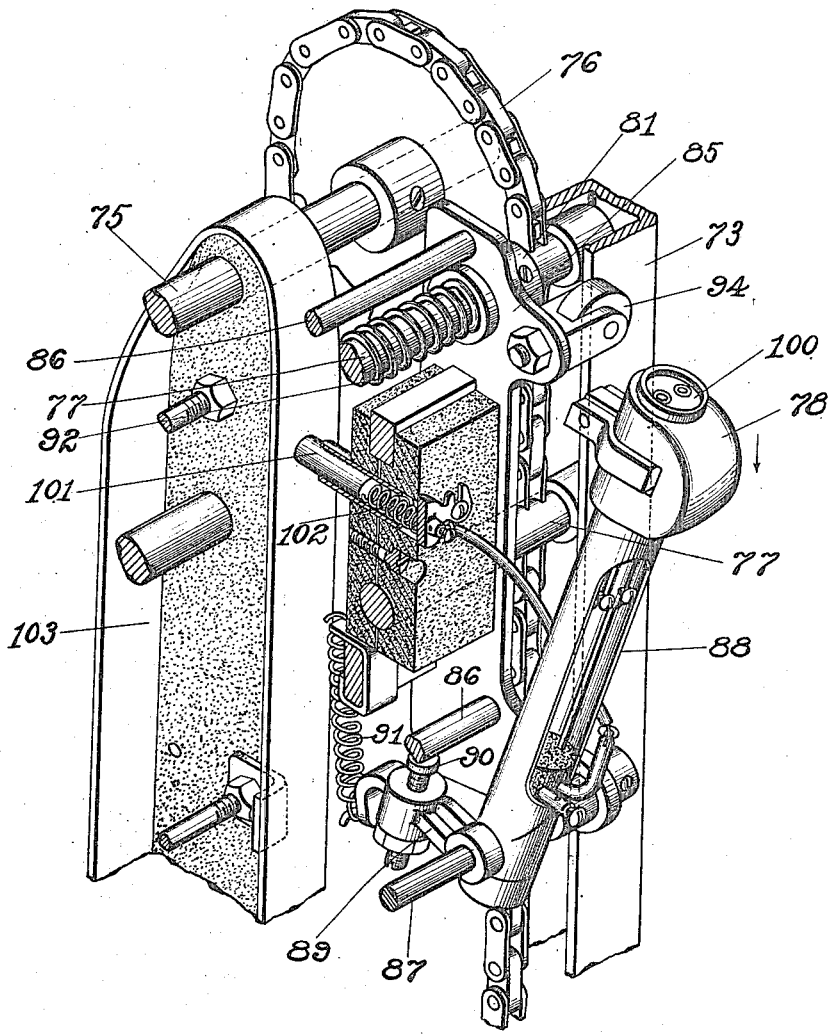
Figure 10:
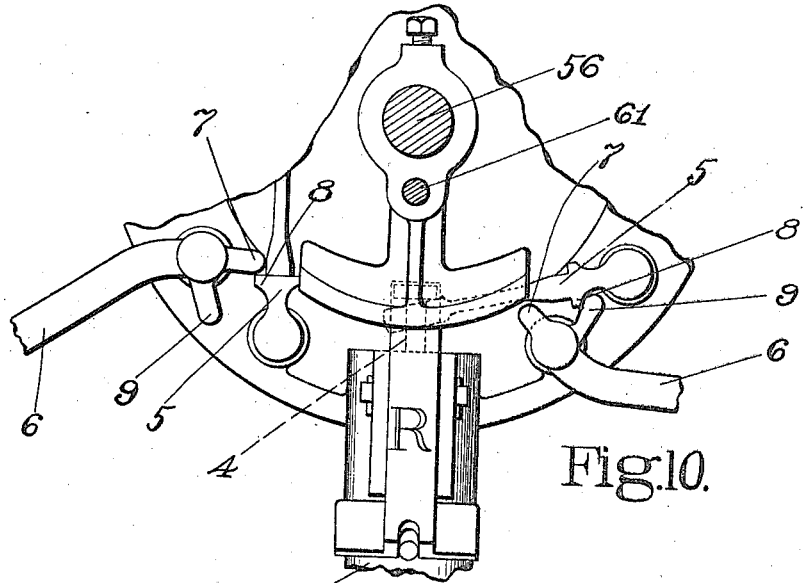
Figure 11:
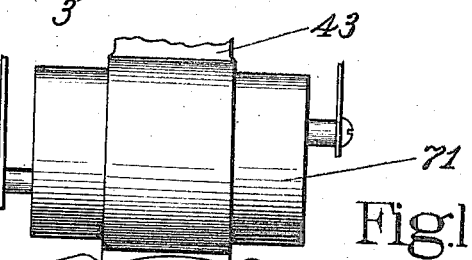
Figure 12:
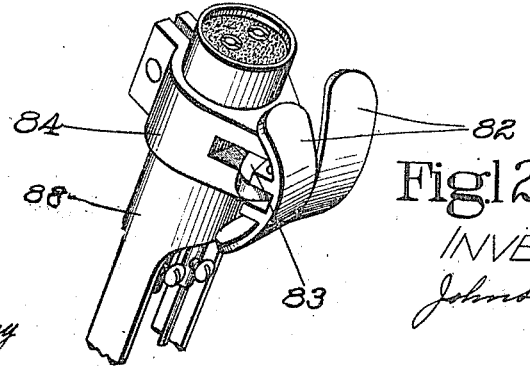
Figure 13:
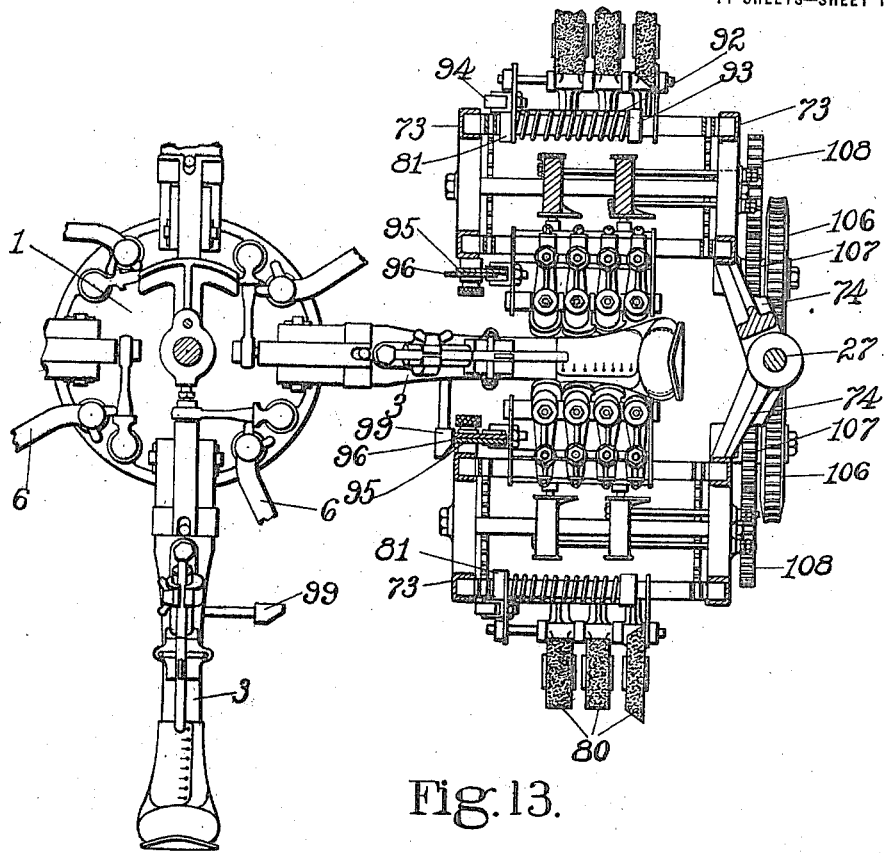
Figure 14:
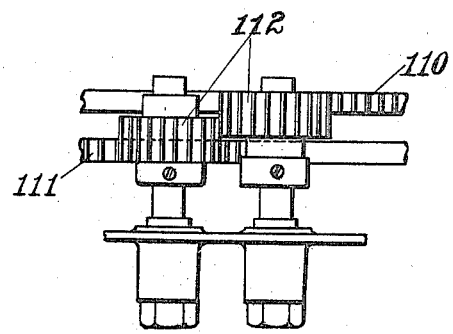

In the drawings,

Figure 1 is a front view of the machine in elevation,

Fig. 2 is a side elevation of the upper portion of the machine viewed from the right with reference to Fig. 1, Fig. 3 is a vertical section of a portion of the machine on the line 3—3 of Fig. 4, certain portions being shown in elevation, Fig. 4 is a view in horizontal section with parts of the machine removed, Fig. 5 shows in detail the back stay treating mechanism, Fig. 6 shows in detail the mechanism for operating upon the instep or front of the shoe, Fig. 7 is a view in elevation of the side treating mechanisms as seen from the right in Fig. 2, Fig. 8 shows one of the side treating mechanisms in detail, Fig. 9 is a view in greater detail of a portion of the mechanism shown in Fig. 8, Fig. 10 shows the mechanism for effecting expansion of the shoe trees, Fig. 11 shows one of the instep ironing tools, Fig. 12 shows one of the side ironing tools, Fig. 13 is a plan view of a portion of the machine, and Fig. 14 is a detail of a part of the gearing for positioning the side treating mechanisms.

The machine shown comprises, in its general organization, a turret carrying four trees, two rights and two lefts, mechanism for ironing and cleaning the back of the upper of a shoe, and which, for convenience, will be hereinafter referred to as the back stay treating or ironing mechanism, since the back of a shoe usually is provided with a back stay; another mechanism for treating the top of the toe, vamp and instep portions of the shoe, which for convenience will be referred to hereinafter as the instep treating or ironing mechanism, and two mechanisms for operating simultaneously on the opposite sides of a shoe to iron and clean the lateral portions of the upper, which mechanisms will be hereinafter referred to as the side treating or ironing mechanisms. The arrangement in the machine shown is such that the back stay ironing mechanism and the instep ironing mechanism operate simultaneously on the shoe, and at the time when these mechanisms are treating a shoe the side ironing mechanisms are operating on another shoe. The detailed description of these parts and mechanisms will be taken up substantially in the order in which they have just been mentioned.

The turret 1 is mounted to rotate in a horizontal plane on the top of a base 2 and is provided with four brackets equally spaced about the turret, which are each designed to support rotatively a tree leg 3 preferably of the type known as a "Miller tree", and shown in the patent to Tyler 319,356, granted June 2, 1885. Each of these tree legs is equipped with a suitable tree foot adapted to support a boot or shoe, and is arranged to be expanded to stretch the shoe by moving an expanding rod 4 (see Fig. 10) longitudinally of the tree toward the axis of the turret. For this purpose the rod 4 is provided with a head and is straddled at a point between the head and the tree leg by the bifurcated end of a lever 5 which is pivoted on the turret. A hand lever 6, also fulcrumed on the turret beside the lever 5 has a part 7 that is arranged to bear against the side of the lever 5 and move it in such a direction as to effect through the rod 4, an expansion of the tree. The lever 5 is provided with a shoulder 8 (see Fig. 10) and a flat portion adjacent to said shoulder, against which portion the end 7 of the hand lever 6 can bear, and which is so located with relation to the fulcrum points of the two levers 5 and 6 that when the part 7 is against said shoulder it prevents any return movement of the lever 5 and therefore locks the tree in expanded condition. A spring in the leg of the tree automatically effects the collapse of the tree as soon as it is unlocked. A lug 9 on the hand lever 6 is arranged to strike the back of the shoulder 8 when the hand lever is moved to permit the tree to collapse and thus to limit the movement of the hand lever 6. In Fig. 10, at the left of the figure, the levers 5 and 6 are shown in the positions that they occupy when the tree is expanded and at the right of the figure these parts are shown in the positions that they occupy when the tree is collapsed.

Preferably, the turret is provided with two right and two left trees, the rights and lefts being alternated. In order to lock the turret against rotation, the base 2 is provided with guides in which a vertical spring pressed pin 10 is mounted and a helical spring is arranged to hold the pin normally in a lifted position where it will enter any one of the four bushed holes 11 provided in the turret. In order to depress this pin to unlock the turret, a hand lever 12 is pivoted on a bracket projecting from the upper part of the base 2 and this lever is provided with teeth adapted to mesh with a segmental gear 13 fulcrumed in said bracket and which, in turn, meshes with a rack formed on the upper part of the pin 10. This arrangement is best illustrated in Fig. 1 from which it will be seen that, when the lever 12 is depressed, the pin 10 also will be depressed, thus unlocking the turret and permitting it to be rotated.

The back stay ironing mechanism is best illustrated in Fig. 5 and comprises a shaft 14 having fast thereon a tool holder 15 that supports a pair of irons 16 and a pair of brushes 17, the irons and brushes preferably being alternated and projected radially outward from the shaft for movement bodily in a closed path during the rotation of the shaft. The brushes shown are of the ordinary rotary type, but are clamped in holders designed to keep them from rotating on their own axes. When one portion of a brush becomes worn its clamp may be loosened and the brush adjusted to bring a different portion into position to act on the work. Each of the irons 16 preferably is secured to the holder by a pivot pin extending at right angles to the shaft 14 and permitting the iron to rock on the end of the holder in a plane parallel to the axis of the shaft 14. This movement enables each iron to adjust itself to the contour of the shoe on which it is working. The shaft 14 is supported in the ends of a pair of arms 18 that are fulcrumed on a shaft 19 which is mounted in bearings in the machine frame. The back stay ironing mechanism, therefore, is enabled to swing in a vertical plane toward and from the back of the shoe. The movement of the mechanism into and out of engagement with the shoe is controlled by a lever 20 having an adjustable handle 21 and fulcrumed on the shaft 19, this lever having an extension projecting beyond its fulcrum point and lying close beside one of the bracket arms 18, as best shown in Figs. 3 and 4. A spring 22, connected at one end to this part of the lever 20 and at its opposite end to a bracket depending from the adjacent arm 18, yieldingly connects the controlling lever with the bracket arm so that, when the handle 21 of the controlling lever is depressed, the ironing mechanism will be raised yieldingly through the action of the spring 22 into contact with the shoe and will be yieldingly held in this position until the controlling lever is raised again. A latch 23 (see Fig. 3) is pivoted to the controlling lever 20 and has a notch 24 designed to engage a part of the frame and hold the lever in its depressed position. A stop bolt 25, adjustably secured in a lug projecting from the lever 20, (see Fig. 3) is arranged to bear on a bracket projecting from the arm 18 and serves to limit the distance that this arm can be raised with relation to the lever 20 and consequently the height that the tools 16 and 17 can assume with reference to the shoe being treated.

Power is supplied to operate the back stay ironing mechanism and the entire machine by a small electric motor 26 that drives a vertical shaft 27, which in turn drives the shaft 19 by means of a gear connection. The shaft 14 has fast thereon a sprocket wheel 28 over which runs a sprocket chain driven by another sprocket wheel 29 fast on the end of the shaft 19. The direction of rotation is such that the tools 16 and 17 rotate in a counter clockwise direction, as seen in Fig. 1, and rub against the back of the shoe from a point on the counter to the top of the upper.

Heat preferably is supplied to the ironing tools 16 by means of electricity. For this purpose the arms of the tool holder 15 that support the two tools 16 are each chambered to receive a heating unit 30, each unit being located as closely as possible to the tool that it is to heat, and a block of insulating material 31 secured to the side of the tool holder 15 carries conductors 32 by which current is carried from one unit to the other. On the shaft 14 and at the side of the tool holder opposite to the block 31 two slip rings 33 and 34, respectively, are secured, both of these rings being insulated from the shaft and also insulated from each other. A conductor 35, connected to the slip ring 34 carries current from this ring to one of the units 30; while similar conductors 36 and 37 connect the opposite unit with the slip ring 33. The two units 30 thus are connected in series. Current supplied to one of the slip rings will flow from this ring through the conductor 35 or 36 to one of the units 30 and from thence through the conductors 32 to the opposite unit and then to the other slip ring. Current is delivered to and conveyed from the slip rings by a pair of brushes arranged to bear on the respective rings, each brush consisting of a member 38 that holds a stick of carbon or similar material in position to bear upon one of the rings. The member 38 has a shank pivoted in a stationary conductor 39 and is acted upon by a spring 40 in a direction tending to move each holder 38 into contact with its slip ring. The two conductors 39 are secured to but insulated from the bracket arms 18 by means of insulating pieces 41 and the rear ends of these conductors are threaded to form terminals for the connection thereto of the current supply cables.

The instep ironing mechanism, which is best illustrated in Figs. 1 and 6, comprises a rotary tool holder 43 fast on the rotary shaft 44 and carrying four smoothing and rubbing tools, preferably two brushes 45 and two ironing tools indicated generally by the numeral 46. This arrangement of tool holder and tools is substantially identical with that of the back stay ironing mechanism, the brushes being somewhat different in shape and size, and the ironing tools slightly different in design to adapt them better to treat the vamp and instep portions of the shoe. The ironing tool, best shown in Fig. 11, preferably comprises a rocker 47 pivoted to one arm of the holder 43; and this rocker carries two smaller rockers 48, each pivoted to the member 47 near its opposite ends, and four independent ironing elements 49 arranged in two pairs, each pair being pivoted to the opposite ends of one of the rockers 48. This construction enables the elements 49 to adjust themselves easily to any contour over which they may be moved. The elements of the two tools 46 preferably are offset with relation to each other, or staggered, so that one of the elements 49 lies opposite the space between two adjacent elements of the opposite tool and operates on the part of the work that might not be treated by the elements of the other tool.

The shaft 44, which supports the instep ironing and cleaning tools, is mounted in the lower end of a swinging frame 50, this frame being suspended on a shaft 51 which is supported in the forward end of a bifurcated arm 52 that is supported partly by a shaft 53 and partly by a bracket arm 54. This arm projects forward from a bracket 55, which is secured to a stationary vertical rod 56, mounted in the center of the turret. Provision is made for a vertical adjustment of the arm 52 relatively to the bracket arm 54 by connecting the members of the arm 52 by means of a bridge 57 and threading a bolt 58 through this bridge in position to bear against the top of the arm 54. When this bolt is turned, the arm 52 is moved up or down, depending on the direction of this turning movement, thus adjusting the instep ironing mechanism longitudinally of the shoe to enable it better to operate on shoes differing considerably in length. The instep ironing mechanism is driven from the shaft 19 by means of a sprocket chain 59 (see Fig. 2), which runs over sprockets fast on the back ends of the shafts 19 and 53; and additional sprockets and chains, which transmit the power from the latter shaft to the shaft 51 and thence to the shaft 44, as will be readily understood from an inspection of Fig. 1.

The back stay and instep ironing mechanisms are arranged to be moved into and out of operative engagement with a shoe simultaneously, and for this purpose the arms 18, which carry the back stay ironing mechanism and swing on the shaft 19, are provided with an extension 60 (see Fig. 1) having a pin and slot connection with a collar slidably mounted on the rod 56 to which is secured the lower end of a vertical rod 61, the upper end of which is connected to a collar 63 that is also arranged to slide up and down on the rod 56. A bell crank lever 64, fulcrumed on a part of the bracket arm 54, has a pin and slot connection with the collar 63, and also is connected by means of a short link 65 to the lower end of a lever 66 which also is fulcrumed on the bracket arm 54. A pair of links 67 and 68, having their opposite ends connected, respectively, to the lever 66 and the frame 50 and having their adjacent ends connected together by a pin and slot, serve to transmit any extended movement of the lever 66 to the frame 50, while permitting the frame to swing to a limited extent with reference to the lever 66. A spring 70 connecting the upper end of the lever 66 with an upward extension of the swinging frame 50 tends to position the lower end of the frame at its forward limit of movement determined by the pin and slot connection between the links 67 and 68. The link 67 is adjustable in the lever 66 so that this forward limit of movement of the frame 50 may be varied. It will now be understood that, when the handle 21 of the controlling lever 20 is depressed to swing the back stay ironing mechanism into operative engagement with a shoe, the rod 61 will be moved downwardly, thus rocking the bell crank lever 64 in a counter-clockwise direction, as the parts are seen in Fig. 1, and through the spring 70 and the connections 65, 66, 67 and 68 with the frame 50 moving this frame forward sufficiently to carry the instep ironing mechanism into contact with the instep portion of the shoe. The ironing mechanism is yieldingly held in this position by means of the spring 70, the pin and slot connection between the members 67 and 68 enabling the mechanism to adjust itself to the shoe as the tools move over the work.

The holders for the tools 46 are each chambered to receive an electrically heated unit 71 substantially like the units 30 used in the back stay ironing mechanism; and current is conducted to these units from supply cables 72 by means of conductors, slip rings, and brushes, all arranged in a manner substantially identical with that heretofore described in connection with the back stay ironing mechanism, and which, therefore, need not be described again.

The mechanisms for treating the sides of the shoes comprise frames 73 supported on arms 74 which are mounted for swinging movement about the motor shaft 27; the frames being angularly disposed with reference to the arms to cause the shoe treating mechanisms, when in operative relation to a shoe as shown in Fig. 13, to assume substantially parallel positions at opposite sides of the shoe. Each of the frames supports a pair of operating shafts 75 having sprocket wheels thereon over which run endless chains 76 which serve, through the provision of cross rods 77 connected to the chains, as carriers for the shoe treating devices. These rods are extended beyond the chains and run in guideways in the frames 73, as shown clearly in Figs. 9 and 13, so as to prevent the chains from swinging and to hold the portions of the chains between the sprocket wheels in position to maintain the shoe treating devices in effective operative relation to the shoe. These devices, in the construction shown, comprise two sets or groups of ironing tools 78 and two sets of cleaning or smoothing tools 80, preferably brushes, which alternate with the sets of ironing tools in their positions upon the carrier. The ironing tools of each set are offset or staggered in relation to the tools of the other set, so that the tools of one set will treat portions of the shoe which may not be treated by those of the other set. One of the tools 78 in each set, Figs. 8 and 12, has ironing portions 82 pivoted to a rocker 83 which is in turn pivoted to the holder 84, so that the portions 82 may swing and adjust themselves freely in planes transverse to the direction of movement of the tool and may be relatively projected toward the shoe, in a manner similar to the adjustment of the instep ironing tools 49, Fig. 11, the purpose of such movement of the members 82 being to enable the tool to reach effectively all portions of the upper adjacent to the rand crease. The other ironing tools are mounted for limited sidewise turning movement upon their holders. The two sets of brushes 80, similarly to the ironing tools, are arranged in staggered relation upon the carrier, and one of the brushes in each set, Fig. 8, is of conical formation to enable it to penetrate effectively into the rand crease. The brushes are circular in form and, while pivotally mounted upon their supports, are held tightly by their side clamps in substantially the same manner as the brushes of the instep and back stay treating mechanisms, to prevent them from rotating during the operation of the machine.

By reference to Figs. 8 and 9 it will be seen that there are two of the rods 77 for supporting each of the sets of ironing and cleaning tools. Mounted loosely upon these rods are plates 85 held in spaced relation by connections 86 and supporting rods 87 which carry the tools. The ironing tools of each set are mounted upon holders 88 which are pivoted upon the rod 87, the holders being held in properly spaced relation by means of collars on the rod. Each of the holders, Fig. 9, has a rearwardly projecting lug 89 in which is threaded an adjustable screw 90 in position to bear upon one of the rods 86 which serves as a stop member. A spring 91 connected to the lug 89 and to a relatively fixed portion of the carrier mechanism serves to maintain the tool outwardly projected as far as permitted by the stop, so as to reach the most remote portions of the shoe opposite to the tool, while permitting the tool to swing inwardly in accordance with variations in the contour of that portion of the shoe traversed by the tool. In a similar manner the several brushes 80 are supported upon a rod 87 and are yieldably positioned and adjustably controlled. With this arrangement it will be seen that each of the ironing tools or brushes may be adjusted independently of others in the set to vary its extent of projection toward the shoe as required by the shape of the shoe presented for treatment.

Associated with each of the supporting frames, comprising the members 85 and 86, is a spring 92 encircling one of the rods 77, and bearing at one end upon a collar 93 fast on the rod and at its other end against one of the plates 85 so as to move the frame as far as permitted by a collar 81 on the rod 77. All the sets of side treating devices are thus maintained normally as near to one side of the mechanism as permitted by the collars 81 which may be adjusted to vary the lateral positions of the different devices.

It will be readily understood from a consideration of the shape of a shoe that if a side ironing or cleaning device is to reach effectively all portions of the side of the upper as it moves lengthwise along the shoe, it must have a movement also in a lateral direction transverse to the direction of its longitudinal movement, so that the path of movement of the device, for the best results, shall be substantially parallel to the curve of the rand crease in the direction of the height of the shoe. In the construction of this invention such lateral movement is permitted by the arrangement above described whereby the different devices are slidable upon their supporting rods and are normally positioned by the springs; and in order to direct the devices and cause them to move in the required path the invention provides cam means for moving the supporting frames laterally in opposition to the springs 92 and for determining the path of movement of the devices while they are within the range of operation of the cams. Each of the frames which supports the ironing tools or the brushes carries at one side a roll 94, all the rolls being located at the same side of the mechanism, and in the path of these rolls is a cam 95 detachably mounted on the frame 73 in position to determine the path of movement of the shoe treating devices during their periods of contact with the shoe. Since the curve of the rand crease in the direction referred to is different at different sides of a shoe, it is preferable, for the best results, to cause the devices to move in different paths corresponding to different sides of shoes presented for treatment. The cam 95 therefore determines the path of movement for one side only of the shoes, preferably the outer side, since the curve at this side is flatter than at the inner side. The curve of the cam corresponds substantially to the curve of the rand crease at this side in the direction of the height of the shoe, or to a projection of the line of the rand crease upon the vertical longitudinal plane of the shoe, and the cam is formed by obtaining such a projection, preferably by making a tracing following the curve at the edge of the bottom portion of the tree foot or last. In order properly to treat the inner side of a shoe a second cam 96 is provided, formed in a similar manner and having a curve corresponding to the deeper curve of the rand crease at this side. For determining the movement of the ironing and cleaning devices near the ends of the shoes, portions of the cam 95 may be used for the inner side as well as the outer side, and it is therefore unnecessary that the cam 96 be as long as the cam 95, although the cam 96 may be of the full length if desired. In the construction shown, the cam 96 is pivotally mounted upon one side of the cam 95 so as to swing with reference to the latter cam a limited distance determined by a pin 97 on the cam 95 and a slot 98 in the cam 96. The cam 96 hangs normally with its curved surface inside the operative surface of the other cam, but may be swung at the required time to cause portions of its active surface to project beyond the cam 95 and operate upon the rolls 94 instead of the other cam.

Each of the side treating mechanisms is provided with a pair of cams such as described above, as shown clearly in Fig. 13. Since the turret carries trees for both right and left shoes and presents both shoes of a pair in the same relation to the side treating mechanisms, it will be understood that corresponding to the presentation of different shoes of a pair for treatment, the paths of movement of the opposite mechanisms should be relatively reversed. Since each mechanism is normally arranged for movement corresponding to the presentation of the outer side of a shoe to that mechanism, by reason of the fixed position of the cam 95, it is only necessary to cause the projection of one or the other of the cams 96 in accordance with the presentation of a right or a left shoe. In the construction shown, this is effected automatically by means of a cam block 99 projecting at that side of the tree at which the inner side of the respective shoe is positioned, and properly located to contact with the cam 96 at that side when the frames 73 are swung inwardly to the position shown in Fig. 13. It will be apparent that in Fig. 13 a left shoe is in process of treatment, and that upon the next quarter rotation of the turret a right shoe will be brought into position and the other cam 96 will then be rendered operative by the respective cam block 99. It is preferable to use a differently shaped set of cams for each different style of shoe, and the cams 95 therefore are readily detachable from the frames 73 to permit such substitution. It is found to be feasible, however, to use the same cams for different sizes of each style, and the cams are of suitable length to permit such use.

The side ironing tools, as well as those for ironing the instep and the backstay, are preferably heated electrically, and to this end each tool includes a heating unit 100 and the current is conducted through these units in series as shown in Fig. 8. Each set of ironing tools includes an inlet and an outlet terminal which are movable therewith, one of these terminals being shown at 101 in Fig. 9. These terminals are held constantly by means of springs 102 in contact respectively with relatively stationary inlet and outlet terminals in the form of insulated plates 103 arranged within the path of movement of the ironing tools and connected respectively to flexible inlet and outlet conductors arranged in pairs as shown at 104 in Fig. 7. In order to conserve as much as possible the heat of the tools and prevent it from being conducted to other parts of the machine, the holders 88 for a considerable portion of their length are broken away at opposite sides.

Operative movement is imparted to the side ironing tools and brushes through their endless carriers by means of a worm 105 on the shaft 27 in mesh with gears 106 mounted on the frames 73 and driving smaller gears 107 which mesh with gears 108 on the lower shafts 75. With this arrangement the gears 106 will remain in mesh with the worm 105 in all positions of the frames 73, and the ironing tools and brushes of each mechanism will thus be driven constantly in the same direction in a closed path during the operation of the power shaft 27, the devices moving in the direction indicated by the arrow in Fig. 9 and therefore upwardly while operating upon a shoe as shown clearly in Fig. 7.

For the purpose of swinging the side treating mechanisms into and out of operative relation to a shoe, the frames 73 are connected by links 109 to gears 110 and 111 respectively, which are mounted concentrically and are connected by gearing 112 in a manner to cause them to rotate simultaneously in opposite directions. The links 109 are so connected to the respective gears that rotation of the gears will cause the frames 73 to swing equal distances from the full to the dotted line positions, Fig. 4, so as to bring the respective mechanisms into operative relation to the shoe. A gear 113 is connected to the same shaft as the gear 110 and rotates in unison with the latter gear, while the gear 111 is mounted loosely upon the shaft. The gear 113 is in mesh with a gear 114 which is arranged to be driven by a rack 115 mounted to slide in a guideway 116 in the frame of the machine. It will now be apparent from an inspection of Fig. 4 that movement of the rack 115 toward the right from the position shown in this figure will cause the gears 110 and 111 to rotate in directions to swing the side treating mechanisms to operative position, and that return movement of the rack will restore the mechanisms to their retracted position to permit another shoe to be presented for treatment through rotation of the turret.

Mounted upon the rack 115 are standards 117 to which are secured parallel spaced racks 118 having reversely cut teeth. Fulcrumed on the shaft 19 at one side of the lever 20 is a frame comprising side members 119 and 120 and connecting rods 121, and journaled in bearings in this frame are shafts 122 and 123 to which are secured respectively gears 124 and 125, these gears being in mesh with each other and driven from a gear 126 on the shaft 19. The shaft 123 carries also a toothed wheel or pinion 127 which is positioned between the rack members 118 and is constantly driven from the shaft 19 in a clockwise direction as viewed in Fig. 3. The member 120 has a forward extension which is positioned between adjustable stops 128 and 129 on a bracket 130 secured to the lever 20 and rests normally upon the end of the stop 128 so that the frame is supported with the gear 127 out of engagement with both rack members when the latter are at their forward limit of movement as shown in Fig. 3, the upper rack member being broken away at 131 so as to clear the gear at this point. The limit of upward movement of the lever 20 is determined by a stop 132 on the frame of the machine.

From the construction thus far described it will be apparent that when the lever 20 is depressed by means of the handle 21, the gear supporting frame which rests upon the stop 128 will swing downwardly by its own weight and carry the pinion 127 into engagement with the teeth of the lower rack 118. A stop screw 133 supports the frame in this position by contact with a pin on the member 120 and permits the lever 20 to be further depressed and locked by the latch 23. Upon engagement with the lower rack 118 the gear 127 moves this rack and the connected rack 115 toward the left, as viewed in Fig. 3, until a cut away portion 134 of the rack reaches a position under the pinion 127 when the pinion will rotate freely without further effect upon the rack. This movement of the rack 115 serves, through the connections previously described, to swing the frames 73 into the dotted line position, Fig. 4, thereby bringing the side treating mechanisms into operative relation to a shoe, the points of connection of the links 109 with the respective gears reaching through this movement nearly dead center positions with reference to the axis of the gears so that the frames 73, by reason also of their weight and inertia, tend to remain in their operative positions during the treatment of the shoe. A weight 135 connected by a chain 136 with the rack 115 serves to steady the racks in their movement.

The length of time that the sides of the shoe are treated by the respective mechanisms depends upon the length of time that the lever 20 is locked in its lower position by the latch 23. The latch is disengaged automatically at a predetermined time by mechanism comprising a rack 137 sliding in a guideway in line with the latch and held normally by means of a weight 138 retracted from the latch as far as permitted by a stop pin 139 which may be inserted adjustably in any one of a number of holes along the guideway. The rack is moved toward the latch by a pawl 140 operated constantly by an eccentric 141 on the shaft 19 but resting upon the end of a pivoted retaining dog 142 and out of engagement with the rack 137 at all times except when the pinion 127 is in its lowest position. The dog 142 is pivoted to a standard 143 on the frame of the machine and has a pin which engages in a slot in a link 144 suspended from a lug 145 on the lever 20. This pin and slot connection serves to support the dog normally out of engagement with the rack 137 and thereby to hold the pawl 140 out of such engagement, as shown in Fig. 3, but when the lever 20 is depressed to bring the pinion 127 into engagement with the rack 118 the dog and the pawl are engaged also with the rack 137. Each rotation of the shaft 19 now serves, during and after the movement of the rack 115 to the left from the position shown in Fig. 3, to advance the rack 137 a distance determined by the length of one tooth of the rack, and the dog 142 holds the rack while the pawl 140 is retracted to engage another tooth. This operation continues until the end of the rack 137 reaches the latch 23 and disengages it from the frame. The forward portion of the lever 20 is now swung upwardly by the spring 22, freeing the rack 137 and permitting it to be drawn back against the stop 139 by the weight 138, and bringing the pinion 127 into engagement with the teeth of the upper rack member 118, whereby this rack and the rack 115 are returned to the position shown in Fig. 3 and the side treating mechanisms swung to their inoperative positions away from the shoe. The respective mechanisms will tend to maintain their inoperative positions through the inertia of the parts, since the weight 135 is not heavy enough to affect the position of the mechanisms. The length of time that the sides of the shoe are subjected to treatment will depend, it will be understood, upon the position of the stop 139 and the consequent distance that the rack 137 must travel before disengaging the latch 23, and the length of treatment may thus be readily varied by adjusting the stop 139.

Although the manner of operation of the different parts of the machine has been pointed out in detail in the preceding description, the operation and use of the machine in general will now be briefly described. It will be understood that the various mechanisms for treating the front, rear and sides of the shoe are driven continuously from the power shaft 27 and the ironing tools continuously heated, although the mechanisms are normally retracted to permit the turret to rotate and bring different shoes into position for treatment. Assuming that the operator has mounted a shoe upon the foremost tree and expanded the tree by means of the handle 6, and that shoes are mounted also on the other trees, the turret is unlocked by means of the handle 12 and is given by hand a quarter rotation and then locked by engagement of the pin 10 in the next hole 11. This brings the fresh shoe into position to be treated by the instep and back stay ironing and cleaning mechanisms, and carries a shoe which has just been treated by these mechanisms into position for treatment by the side ironing and cleaning mechanisms. The lever 20 is now depressed by means of the handle 21 and locked by the latch 23. This movement of the lever swings the instep and back stay ironing mechanisms into engagement with the respective shoe, and renders operative the automatic mechanism which serves to swing the side ironing mechanisms into engagement with the shoe presented to them, as previously pointed out in detail. As the frames 73 swing to operative position, the cam block 99 upon the respective tree serves to adjust one or the other pair of cams 95, 96 to determine a movement of the corresponding tools for treatment of the inner side of the shoe. All the mechanisms now continue their operation upon the respective shoes until the latch 23 is disengaged by the rack 137. When this takes place the arms 18 and the back stay ironing mechanism swing downwardly by gravity out of engagement with the shoe, and the instep ironing mechanism also is swung away from the shoe by its operating connections, the lever 20 being swung into engagement with the stop 132 and causing the pinion 127 to engage the upper rack 118 so as to cause the side ironing mechanisms to swing into inoperative position. In the meantime the operator has subjected a shoe which has been treated by the machine to a final dressing operation and has removed it from the tree and mounted another shoe in its place ready for treatment. The turret may now be unlocked and advanced again and the operations previously described repeated.

Although the brushes have been referred to as cleaning devices, it will be understood that they have to a considerable extent a smoothing effect as well as a cleaning effect upon the shoes. It will be apparent, moreover, that in many of its features the invention is not limited to the combination of cleaning devices with the ironing tools, nor to the illustrative construction and arrangement of the ironing tools, but contemplates a considerable latitude of choice in these respects including the use, if desired, of tools constructed for rolling engagement with the work in the manner disclosed, for example, in my prior Patent No. 1,081,907, granted December 16, 1913. It should be understood also that although the machine shown and described includes details of construction which are believed to be the best for practical purposes, various embodiments of the invention in these respects likewise are comprehended within the spirit and scope of the appended claims.

Having described the invention, what I claim as new and desire to secure by Letters Patent of the United States is:—

1. In a machine of the class described, the combination with a shoe supporting tree, of side, instep and back stay ironing mechanisms arranged to operate on a shoe supported on said tree, said side ironing mechanism being arranged to operate on said shoe at a period when said back stay and instep ironing mechanisms are not operating on the shoe.

2. In a machine of the class described, the combination of independent side, instep and back stay ironing mechanisms, a shoe supporting tree, and means supporting said tree for movement to present said shoe to the operation of said instep and back stay ironing mechanisms and into a different position for the operation of said side ironing mechanism on the shoe.

3. In a machine of the class described, the combination of side, instep and back stay ironing mechanisms, a plurality of shoe supporting trees, and a turret supporting said trees for movement into and out of operative relationship to said ironing mechanisms, said instep and back stay ironing mechanisms being arranged to operate on a shoe supported on one of said trees simultaneously with the operation of said side ironing mechanism on another shoe supported on one of said trees.

4. In a machine of the class described, the combination of independent side, instep and back stay ironing mechanisms arranged for simultaneous operation, a plurality of shoe supporting trees, and a turret supporting said trees for movement to present a shoe mounted on any one of said trees to the operation of said instep and back stay ironing mechanisms and into a different position for the operation of said side ironing mechanism on the shoe.

5. In a machine of the class described, the combination of independent side, instep and back stay ironing mechanisms, means for operating said mechanisms, a plurality of shoe supporting trees, a turret supporting said trees for movement into and out of operative relationship to said ironing mechanisms, said mechanisms being movable into and out of operative engagement with the shoes presented to them, and means common to all of said ironing mechanisms for controlling their operative engagement with said shoes.

6. In a machine of the class described, the combination with a turret and a plurality of trees carried thereby, of a back stay ironing mechanism, an instep ironing mechanism, and side ironing mechanism, said instep and back stay ironing mechanisms being arranged to operate on a shoe supported on any one of said trees simultaneously with the operation of said side ironing mechanism on another shoe supported on one of said trees, and a single means for controlling the operative engagement of all of said ironing mechanisms with said shoes.

7. In a machine of the class described, the combination with a turret and a plurality of trees carried thereby, of a plurality of independent ironing mechanisms arranged to operate on different shoes supported on said trees, and a common controlling means for initiating the operation of said mechanisms.

8. In a machine of the class described, the combination with a turret and a plurality of trees carried thereby, of a plurality of independent ironing mechanisms arranged to operate simultaneously on different shoes supported on said trees, and a common controlling means for initiating the operation of said mechanisms on their respective shoes.

9. In a machine of the class described, the combination with a turret and a plurality of trees carried thereby, of a plurality of independent ironing mechanisms, each adapted to treat a different part of a shoe, said mechanisms being arranged to operate simultaneously on different shoes supported on said trees, and a single means for controlling the operative engagement of said ironing mechanisms with said shoes.

10. In a machine of the class described, the combination with a turret and a plurality of trees carried thereby, of a plurality of independent ironing mechanisms arranged to operate simultaneously on different shoes supported on said trees, and a common controlling means for initiating the operation of said mechanisms on their respective shoes, said means being arranged to terminate automatically the operation of said mechanisms on the shoes.

11. In a machine of the class described, the combination with a turret and a plurality of trees carried thereby, of a plurality of independent ironing mechanisms adapted respectively to treat different parts of a shoe, said mechanisms being arranged to operate simultaneously on different shoes supported on said trees, and a single means for controlling the operative engagement of said ironing mechanisms with said shoes, said means being arranged to terminate automatically the operation of said mechanisms on a shoe and being adjustable to vary the length of said operation.

12. In a machine of the class described, the combination with a turret and a plurality of trees carried thereby, of instep ironing mechanism, back stay ironing mechanism, said mechanisms being movable into or out of position to engage a shoe in their operative movement, said turret being arranged to present a shoe mounted on any one of said trees to the operation of said mechanisms, and means common to both of said ironing mechanisms for controlling their movement into position to engage a shoe.

13. In a machine of the class described, the combination with a turret and a plurality of trees carried thereby, of instep ironing mechanism, back stay ironing mechanism, said turret being arranged to present a shoe mounted on any one of said trees to the operation of said mechanisms, and means common to both of said ironing mechanisms for controlling their operative engagement with the shoe to be ironed, said means being arranged to terminate automatically the operation of said mechanisms on the shoe and being adjustable to vary the length of the time of operation of said mechanisms on the shoe.

14. In a machine of the class described, the combination of independent instep and back stay ironing mechanisms, a shoe supporting tree, means supporting said tree for movement into and out of operative relationship to said mechanisms, said mechanisms being movable into and out of engagement with a shoe presented to them, and means for moving said mechanisms substantially simultaneously into engagement with a shoe so presented and for holding them yieldingly in engagement with the shoe.

15. In a machine of the class described, the combination of instep ironing mechanism, a shoe supporting tree, means supporting said tree for movement into and out of operative relationship to said mechanism, said mechanism and tree being arranged for relative adjustment in the direction of the length of the shoe to enable the machine to accommodate shoes of different sizes.

16. In a machine of the class described, the combination of a turret revoluble in a substantially horizontal plane, a plurality of trees carried by said turret, instep ironing mechanism and back stay ironing mechanism, and means for operating said mechanisms, said turret being arranged to present a shoe supported on any one of said trees to the operation of said mechanisms and both of said mechanisms being movable into and out of position to engage the shoe in their operative movement.

17. In a machine of the class described, the combination of a turret revoluble in a substantially horizontal plane, a plurality of trees carried by said turret, instep ironing mechanism and back stay ironing mechanism, and means for operating said mechanisms, said turret being arranged to present a shoe supported on any one of said trees to the operation of said mechanisms and both of said mechanisms being arranged for movement in a vertical plane into and out of position to engage in their operative movement a shoe so presented.

18. In a machine of the class described, the combination of independent side, instep and back stay ironing means, a plurality of shoe supporting trees, a turret supporting said trees for movement into and out of operative relationship to said ironing means, said means being movable into and out of operative engagement with the shoes presented to them, power driven mechanism operative to move the side ironing means into or out of operative engagement with a shoe, and manually operated means for moving said instep and back stay ironing means into engagement with a shoe and for simultaneously initiating the operation of said power driven mechanism to effect the engagement of the side ironing means with a shoe.

19. In a machine of the class described, the combination of independent side, instep and back stay ironing means, a plurality of shoe supporting trees, a turret supporting said trees for movement into and out of operative relationship to said ironing means, said means being movable into and out of operative engagement with the shoes presented to them, power driven mechanism operative to move the side ironing means into or out of operative engagement with a shoe, manually operated means for moving said instep and back stay ironing means into engagement with a shoe and for simultaneously initiating the operation of said power driven mechanism to effect the engagement of the side ironing means with a shoe, and means operative automatically to interrupt the operation of all of said ironing means on the shoes.

20. In a machine of the class described, the combination with a shoe support, of an ironing tool mounted for movement along a shoe upon the support and into and out of engagement with the shoe, means for heating said ironing tool, and means for imparting continuous movement to the tool during its period of contact with the shoe.

21. In a machine of the class described, the combination with a shoe support, of an ironing device mounted for movement along the side of a shoe upon the support, said device comprising a tool having ironing portions pivoted to swing relatively to each other in a plane transverse to the direction of movement of the device and arranged to traverse the shoe upper close to the edge of the sole, and other tools of different shoe engaging contour from said first named tool arranged to traverse other portions of the upper simultaneously with said first tool.

22. In a machine of the class described, the combination with a shoe support, of a plurality of ironing tools mounted for movement simultaneously over the side of a shoe upon the support, one of said tools comprising members mounted to swing relatively to each other in a plane transverse to the direction of movement of the tool over the shoe and for relative bodily movement toward or from the shoe, and the other tools having shoe engaging portions of different construction from the members of said first named tool for engaging other portions of the upper.

23. In a machine of the class described, the combination with a shoe support, of an ironing device mounted for movement along the side of a shoe upon the support and comprising a plurality of shoe engaging tools mounted for turning movement in planes transverse to the direction of movement of the device, one of said tools comprising members relatively movable bodily toward or from the shoe for engaging the upper close to the rand crease, and the other tools having broader shoe engaging surfaces than the members of said first named tool.

24. A machine of the class described having, in combination, a shoe ironing member and a shoe cleaning member mounted for movement in succession over the shoe, and means for causing said members to traverse the shoe continuously in the same direction during their periods of engagement with the shoe.

25. A machine of the class described having, in combination, a shoe support, a shoe ironing member and a shoe cleaning member mounted for movement in succession over a shoe mounted on said support, and operating means for said members constructed and arranged to move them continuously in the same direction in a closed path and into and out of engagement with the shoe.

26. A machine of the class described having, in combination, a shoe support, a shoe ironing member and a shoe cleaning member mounted for movement over a shoe upon the support, and operating means for said members constructed and arranged to move said members continuously during their engagement with the shoe and into and out of contact therewith.

27. A machine of the class described having, in combination, a plurality of shoe ironing devices mounted for movement in succession over the shoe, and a plurality of shoe cleaning devices movable over the shoe in substantially the same direction as the ironing devices and arranged to alternate with said ironing devices in treatment of the shoe.

28. A machine of the class described having, in combination, shoe ironing devices mounted for movement in succession over the side of a shoe and arranged relatively for traversing substantially all portions of the side of the shoe, and shoe cleaning devices alternating with said ironing devices in treatment of the shoe and similarly arranged relatively for traversing substantially all portions of the side of the shoe.

29. A machine of the class described having, in combination, a plurality of shoe treating devices mounted for continuous movement in the same direction in a closed path and comprising shoe ironing devices alternating with shoe cleaning devices in the direction of said movement, and means for presenting a shoe in position to receive the treatment of said devices.

30. A machine of the class described having, in combination, a shoe support and shoe treating means relatively movable to cause said means to traverse a shoe upon the support, and means for effecting such relative movement of the shoe support and the treating means, said shoe treating means comprising ironing devices and cleaning devices arranged to alternate with the ironing devices in treatment of the shoe.

31. A machine of the class described having, in combination, a shoe support and a shoe treating device relatively movable to cause said device to traverse the side of a shoe upon the support in the direction of the length of the shoe, said device comprising a brush of conical shape for engagement in the rand crease of the shoe, and means for directing said relative movement to cause the larger end portion of the brush to follow substantially the curve of the rand crease.

32. A machine of the class described having, in combination, a shoe support and a brush relatively movable to cause the brush to operate upon a shoe mounted on the support, brush supporting means upon which the brush is pivotally mounted for rotation to different positions of adjustment, and means for preventing rotation of the brush during the operation of the brush upon the shoe.

33. In a machine of the class described, the combination with a shoe support, of a brush and supporting means therefor movable to carry the brush bodily over the shoe, said brush being circular in form and pivotally mounted upon its supporting means for rotation to different positions of adjustment, and means for clamping the brush against rotation during its movement over the shoe.

34. In a machine of the class described, a shoe treating device mounted for continuous bodily movement in a closed path, means for presenting a shoe in position to be traversed along the side in the direction of its length by said device, and means for determining the path of movement of said device over the shoe to cause it to conform substantially to the curve of the rand crease in the direction of the height of the shoe.

35. In a machine of the class described, a shoe treating device mounted for continuous bodily movement in one direction in a closed path and for movement also transversely to said direction of movement, and means for operating upon said device while it is traversing the shoe to effect such transverse movement thereof and cause the device to move in a path conforming substantially to the curve of the rand crease in the direction of the height of the shoe.

36. In a machine of the class described, the combination with a shoe support, of a group of tools mounted for movement with reference to said support in a direction to traverse the side of the shoe lengthwise of the shoe, said tools being movable also laterally with reference to said direction of movement, cam means for determining the lateral position of said group of tools to cause them to move over the shoe in a path conforming substantially to the curve of the rand crease with reference to the height of the shoe, and resilient means for maintaining said tools in operative relation to said cam means during their movement over the shoe.

37. In a machine of the class described, the combination with a shoe support, of a shoe treating device mounted for movement with reference to said support in a direction to traverse the side of the shoe lengthwise of the shoe, said device being movable also laterally with reference to said direction of movement, a cam having a contour conforming substantially to a projection of the curve of the rand crease at the outer side of a shoe upon the vertical longitudinal plane of the shoe, said cam being arranged to cause said device to move in a path laterally curved to correspond to the curve thereof, and a second cam similarly shaped with reference to the rand crease at the inner side of a shoe and mounted adjacent to the first cam, said second cam being adjustable so as to project beyond the first cam and determine a different movement of said device when the inner side of a shoe is presented for treatment.

38. In a machine of the class described, the combination with a shoe support, of a shoe treating device mounted for movement with reference to said support in a direction to traverse the side of the shoe lengthwise of the shoe, said device being movable also laterally with reference to said direction of movement, and a pair of cams shaped respectively to correspond to the curves in the direction of the height of a shoe of the rand creases at the outer and the inner sides of a shoe, said cams being arranged with reference to said device to determine the lateral curve of the path of movement of the device and being relatively adjustable into different operative relations to the device to vary said path of movement.

39. In a machine of the class described, the combination with a shoe support, of a shoe treating device mounted for movement with reference to said support in a direction to traverse the side of a shoe lengthwise of the shoe, said device being movable also laterally with reference to said direction of movement, and a pair of cams shaped respectively to cause different lateral movements of said device for the treatment of different shoes, one of said cams being mounted in fixed operative relation to the device and the other cam being adjustable into operative relation to the device to cause it to operate upon the device in the place of portions of the first cam.

40. In a machine of the class described, the combination with a shoe support, of a shoe treating device mounted for movement with reference to said support in a direction to traverse the side of a shoe lengthwise of the shoe, said device being movable also laterally with reference to said direction of movement, and a pair of cams shaped respectively to cause different lateral movements of said device for the treatment of different sides of shoes, said machine being constructed for determining selectively different relative locations of said cams in accordance with that side of a shoe which is presented for treatment.

41. In a machine of the class described, the combination with a shoe support, of a shoe treating device mounted for movement with reference to said support in a direction to traverse the side of the shoe lengthwise of the shoe, said device being movable also laterally with reference to said direction of movement, a pair of cams shaped respectively to cause different lateral movements of said device for the treatment of different sides of shoes, one of said cams being mounted in fixed operative relation to the device and the other cam being adjustable into operative relation to the device to cause it to operate upon the device, and automatic means for effecting such adjustment of the second cam upon the presentation of the corresponding side of a shoe for treatment.

42. A machine of the class described having, in combination, shoe treating means comprising a device for traversing the side of a shoe in the direction of the length of the shoe, means for operating said device, means for presenting either a right or a left shoe in position to be treated by the device, a pair of cams arranged with reference to said device to determine respectively different paths of movement thereof for different shoes of a pair, and means for relatively adjusting said cams to determine a path of movement corresponding to one of the shoes of a pair presented for treatment.

43. A machine of the class described having, in combination, shoe treating means comprising a device for traversing the side of a shoe in the direction of the length of the shoe, means for operating said device, means for presenting either a right or a left shoe in position to be treated by the device, and a pair of cams arranged with reference to said device to determine respectively different paths of movement thereof for different shoes of a pair, said cams being detachable to permit the substitution of cams of different shapes for different styles of shoes.

44. A machine of the class described having, in combination, shoe treating means comprising a device for traversing the side of a shoe in the direction of the length of the shoe, means for operating said device, means for presenting either a right or a left shoe in position to be treated by the device, means arranged with reference to said device to determine the path of movement thereof and adjustable to cause the device to move in different paths, and means for effecting such adjustment to determine a definite path of movement of the device in accordance with whether the shoe presented is a right or a left.

45. A machine of the class described having, in combination, a pair of shoe trees for right and left shoes respectively, means for treating shoes upon said trees comprising a device for traversing the side of a shoe in the direction of the length of the shoe, said shoe treating means and shoe trees being relatively movable to position said means in operative relation to either of said trees, means arranged with reference to said device to determine the path of movement thereof and adjustable to cause the device to move in different paths, and means associated with one of said shoe trees for effecting such adjustment to determine a definite path of movement of the device upon the presentation of one of the shoes of a pair for treatment.

46. A machine of the class described having, in combination, a pair of shoe trees for right and left shoes respectively, means for treating shoes upon said trees comprising a device for traversing the side of a shoe in the direction of the length of the shoe, said shoe treating means and shoe trees being relatively movable to position said means in operative relation to either of said trees, a pair of cams formed and arranged for determining respectively different paths of movement of said device for treating different sides of shoes, said cams being relatively adjustable, and means associated with one of said trees for effecting relative adjustment of the cams upon the relative movement of said tree and the shoe treating device into operative relation.

47. A machine of the class described having, in combination, shoe treating means comprising a device for traversing the side of a shoe in the direction of the length of the shoe, means for operating said device, means for presenting either a right or a left shoe in position to be treated by the device, and means for determining automatically different paths of movement of the device in accordance with the presentation of a right or a left shoe for treatment.

48. A machine of the class described having, in combination, shoe treating means comprising a device for traversing the side of a shoe in the direction of the length of the shoe, means for operating said device, means for presenting either a right or a left shoe in position to be treated by the device, a pair of cams arranged with reference to said device to determine respectively different paths of movement thereof for different shoes of a pair, one of the cams being disposed normally out of operative relation to the device, and means for bringing the last named cam into operative relation to the device upon the presentation of the corresponding shoe of the pair for treatment.

49. A machine of the class described having, in combination, a pair of shoe trees for right and left shoes respectively, means for treating shoes upon said trees comprising a device for traversing the side of a shoe in the direction of the length of the shoe, said shoe treating means and shoe trees being relatively movable to position said means in operative relation to either of said trees, a pair of cams formed and arranged for determining respectively different paths of movement of said device for treating different sides of shoes, one of said cams being mounted in fixed operative relation to said device and the other cam being adjustable into or out of such operative relation, and means carried by one of said shoe trees for causing such adjustment of said other cam when said tree and the shoe treating means are in operative relation.

50. A machine of the class described having, in combination, shoe treating means comprising a device for traversing the side of a shoe in the direction of the length of the shoe, a rotatable turret, a pair of shoe trees for right and left shoes respectively carried by the turret and movable therewith alternatively into position to present a shoe for the operation of the shoe treating means, said means being movable into or out of position for operating upon a shoe as thus presented, a pair of cams for determining respectively different paths of movement of said device for treating the inner or the outer sides of shoes, said cams being relatively adjustable, and means associated with one of said shoe trees for effecting relative adjustment of the cams upon a movement of the shoe treating means into operative relation to a shoe upon said tree.

51. A machine of the class described having, in combination, shoe treating mechanisms for operating respectively upon opposite sides of a shoe and each comprising one or more tools for traversing the side of the shoe in the direction of the length of the shoe, shoe supporting means arranged to present either a right or a left shoe for treatment by said tools, and means for guiding the tools of said mechanisms in differently curved paths to cause them to follow respectively the portions of the rand crease on opposite sides of a shoe.

52. A machine of the class described having, in combination, shoe treating mechanisms for operating respectively upon opposite sides of a shoe and each comprising one or more tools for traversing the side of the shoe in the direction of the length of the shoe, shoe supporting means arranged to present either a right or a left shoe for treatment by said tools, and means for guiding the tools of said mechanisms in differently curved paths to cause them to follow respectively the portions of the rand crease on opposite sides of a shoe, said means being constructed and arranged for changing the respective paths of travel of said tools for right or left shoes.

53. A machine of the class described having, in combination, shoe treating mechanisms for operating respectively upon opposite sides of a shoe and each comprising one or more tools for traversing the side of the shoe in the direction of the length of the shoe, shoe supporting means arranged to present either a right or a left shoe for treatment by said tools, each of said mechanisms having guiding means for determining the path of movement of the shoe treating tools adjustable to cause the tools to move in different paths, and means for effecting adjustment of one or the other of said guiding means upon the presentation respectively of a right or a left shoe for treatment.

54. A machine of the class described having, in combination, shoe treating mechanisms for operating respectively upon opposite sides of a shoe and each comprising one or more tools for traversing the side of the shoe in the direction of the length of the shoe, shoe supporting means arranged to present either a right or a left shoe for treatment by said tools, each of said mechanisms having a pair of cams for determining respectively different paths of movement of the shoe treating tools for treating the inner or the outer side of a shoe, said cams being normally positioned for determining one path of movement of the tools and relatively adjustable for determining a different path of movement, and means for effecting such relative adjustment of the cams of one or the other of said mechanisms in accordance with the presentation of a right or a left shoe for treatment.

55. A machine of the class described having, in combination, shoe treating mechanisms for operating respectively upon opposite sides of a shoe and each comprising a device for traversing the side of the shoe in the direction of the length of the shoe, shoe supporting means arranged to present either a right or a left shoe for treatment by said devices, each of said mechanisms including a fixed cam and a movable cam for determining respectively different paths of movement of the shoe treating device for treating the inner or the outer side of a shoe, said movable cams being normally out of operative relation to the shoe treating devices, and means for positioning the movable cam of one or the other of said mechanisms in operative relation to the respective shoe treating device in accordance with the presentation of a right or a left shoe for treatment.

56. A machine of the class described having, in combination, shoe treating mechanisms for operating respectively upon opposite sides of a shoe and each comprising a device for traversing the side of the shoe in the direction of the length of the shoe, a pair of shoe trees for right and left shoes respectively movable alternatively into position to present a shoe for treatment by said devices, each of said mechanisms including a fixed cam formed and arranged to cause the respective shoe treating device to move in a predetermined path for treating the outer side of a shoe and a movable cam normally positioned out of operative relation to said device and formed to determine a path of movement of the device corresponding to the inner side of a shoe, and means associated with each of said shoe trees for positioning in operative relation to its respective shoe treating device the movable cam of that mechanism which is positioned for treatment of the inner side of the shoe presented.

57. In a machine of the class described, an endless carrier, a plurality of tools carried thereby and arranged for limited movement transversely thereof, means for presenting a shoe in position to be operated upon by said tools, resilient means for positioning said tools normally with reference to the carrier, and cam means arranged to coöperate with said resilient means to cause the tools to move in a path substantially parallel to the rand crease of the shoe.

58. In a machine of the class described, the combination with a support for a shoe, of a plurality of tools for operating upon the shoe, an endless carrier for the tools arranged to move the tools in a substantially vertical direction during treatment of the shoe, said carrier being movable about a substantially vertical axis to carry the tools into or out of operative relation to the shoe.

59. In a machine of the class described, a shoe support, and shoe treating mechanisms mounted for swinging movement about the same axis into and out of operative relation to the sides of a shoe upon the support and comprising endless carriers and groups of tools on said carriers, said mechanisms being so disposed with reference to said axis as to sustain a substantially parallel relation to each other when in operative position.

60. In a machine of the class described, a shoe support, an operating shaft, a pair of frames mounted to swing about the axis of the shaft toward and from the shoe support, an endless carrier on each frame, shoe treating devices mounted on said carriers, and operating connections between the shaft and said carriers arranged to remain in operative relation to the shaft in all positions of said frames.

61. In a machine of the class described, the combination with a support for a shoe, of a plurality of tools for operating upon the shoe, an endless carrier for the tools, means for operating the carrier, and automatic means for swinging the carrier away from the shoe after the shoe has received a predetermined amount of treatment by the tools.

62. In a machine of the class described, a vertical operating shaft, a frame mounted to swing about the axis of said shaft, an endless carrier mounted on the frame, operating connections between the shaft and the carrier, a plurality of tools on the carrier, means for supporting a shoe in position to be operated upon by said tools, and automatic means for swinging the carrier away from the shoe after a predetermined amount of treatment of the shoe.

63. In a machine of the class described, an endless movable carrier, a plurality of shoe treating tools on the carrier, and heating means for the tools comprising electrical heating units and inlet and outlet terminals movable with the carrier, and means for maintaining electrical connection with said terminals continuously during the movement of the carrier.

64. In a machine of the class described, an endless movable carrier, shoe treating tools on the carrier, and heating means for the tools comprising electrical heating units and inlet and outlet terminals movable with the carrier, stationary terminal plates, and means for maintaining said movable terminals in engagement with the plates during the movement of the carrier.

65. In a machine of the class described having a tree for holding a shoe and shoe treating tools movable into and out of position for operating upon the shoe, a reciprocatory member, connections between said member and the tools for effecting said movements thereof, and means for moving said member comprising a rack carried by the member and a driven pinion movable into engagement with the rack.

66. In a machine of the class described having a tree for holding a shoe and shoe treating tools movable into and out of position for operating upon the shoe, a reciprocatory member, connections between said member and the tools for effecting said movements thereof, and means for moving said member comprising a rack carried by the member and a driven pinion movable into engagement with the rack, said rack and pinion being relatively movable automatically to effect disengagement thereof upon the completion of a movement of said member in one direction.

67. In a machine of the class described having a tree for holding a shoe and shoe treating tools movable into and out of position for operating upon the shoe, a reciprocatory frame, connections between said frame and the tools for effecting said movements thereof, and means for effecting the reciprocatory movements of said frame comprising opposite racks on the frame, a driven pinion normally out of engagement with said racks, and movable into engagement with one of the racks to move the frame in one direction and bring the tools into position to operate upon the shoe, and automatic means for bringing the pinion into engagement with the opposite rack to effect a reverse movement of the frame after a predetermined amount of treatment of the shoe.

68. In a machine of the class described having a tree for holding a shoe and shoe treating tools movable into and out of position for operating upon the shoe, a reciprocatory frame, connections between said frame and the tools for effecting said movements thereof, and means for effecting the reciprocatory movements of said frame comprising opposite racks on the frame, a driven pinion normally out of engagement with said racks, and movable into engagement with one of the racks to move the frame in one direction and bring the tools into position to operate upon the shoe, and automatic means for bringing the pinion into engagement with the opposite rack to effect a reverse movement of the frame after a predetermined amount of treatment of the shoe, the respective racks and the pinion being relatively movable automatically to effect disengagement thereof upon the completion of the movement of the frame in either direction.

69. A machine of the class described having, in combination, a shoe support, a shoe ironing tool, means for moving said tool bodily in one direction in a closed path to cause it to traverse repeatedly in the same direction a portion of a shoe on said support, and means for heating the tool continuously during said movement.

70. A machine of the class described having, in combination, a shoe support, a shoe ironing tool, means for moving said tool bodily in one direction in a closed path to cause it to traverse repeatedly a portion of a shoe on said support and to move into and out of engagement with the shoe, means for heating the tool, and means for limiting the number of engagements of the tool with the shoe without interrupting the movement of the tool.

71. A machine of the class described having, in combination, a shoe support, a plurality of shoe ironing tools, means for heating said tools, and means for moving the tools to cause them to operate in succession upon a shoe on said support without stopping while in contact with the shoe.

72. A machine of the class described having, in combination, a shoe support, a shoe ironing tool, means for moving the tool bodily to cause it to traverse a shoe on said support, an electrical heating unit movable with the tool for heating the tool, and means for supplying electric current to said heating unit continuously during the operation of the tool comprising terminals movable with the tool and relatively stationary terminals arranged for continuous engagement with said movable terminals during the movement of the tool.

73. A machine of the class described having, in combination, a shoe support, an ironing tool, means for heating said tool, and means for effecting relative traversing movement of said tool and support continuous during the period of engagement of the tool with the shoe.

74. A machine of the class described having, in combination, a shoe support, an ironing tool, means for moving said tool bodily in a circular path, and means for relatively positioning the tool and the shoe support to cause the tool to engage the shoe a plurality of times in succession during said movement.

75. A machine of the class described having, in combination, a shoe support, a plurality of ironing tools arranged in a circular series and rotatable about a common axis, means for rotating said tools, means for relatively positioning the tools and said support to cause the tools to engage the shoe a plurality of times in succession, and means for effecting a relative separating movement of the tools and the shoe while the tools continue their rotation.

76. In a machine of the class described, the combination with a shoe support, of an ironing tool, means for moving the tool bodily in a closed path, means for heating the tool, means for relatively positioning the tool and the shoe support to cause the tool to traverse a shoe on said support a plurality of times in succession, and means for effecting a relative separating movement of the tool and the support while the tool continues its bodily movement.

77. In a machine of the class described, the combination with shoe supporting means, of a plurality of ironing mechanisms for operating respectively upon different portions of a shoe, means for operating said mechanisms, manual means for moving one of said mechanisms into operative relation to a shoe, and power operated means arranged to be controlled by said manual means for moving another of said mechanisms into operative relation to a shoe.

78. In a machine of the class described, the combination with means for supporting a plurality of shoes, of a plurality of ironing mechanisms for operating respectively upon different shoes, means for operating said mechanisms, power operated means for moving one of said mechanisms into operative relation to a shoe, manual means for initiating the operation of said power operated means, and means connecting another of said mechanisms to said manual means to cause said other mechanism to be moved manually into operative relation to a shoe.

79. In a machine of the class described, the combination with means for supporting a plurality of shoes, of independent side, instep and backstay ironing mechanisms, the side ironing mechanism being arranged to operate upon one shoe simultaneously with the operation of the instep and backstay ironing mechanisms upon another shoe, manual means for moving said instep and backstay ironing mechanisms into operative relation to a shoe, and power operated means arranged to be controlled by said manual means for moving the side ironing mechanism into operative relation to a shoe.

80. A machine of the class described having, in combination, a shoe support, tools for operating respectively upon opposite sides of a shoe on said support, means for effecting relative movement of the tools and said support to cause the tools to traverse the sides of the shoe lengthwise of the shoe, and means for relatively guiding the tools and the support to cause the tools to follow the different curves of the portions of the rand crease at the opposite sides of the shoe.

81. A machine of the class described having, in combination, a shoe support, tools for operating respectively upon opposite sides of a shoe on said support, means for moving the tools lengthwise of the shoe, and means for guiding the tools in differently curved paths corresponding to differences in the curve of the rand crease at the opposite sides of the shoe.

82. A machine of the class described having, in combination, a shoe support, tools for operating respectively upon opposite sides of a shoe on said support, means for moving the tools lengthwise of the shoe, and means for guiding the tools in differently curved paths corresponding to differences in the curve of the rand crease at the opposite sides of the shoe, said guiding means comprising cams arranged for detachment to permit the substitution of different cams for different styles of shoes.

83. In a machine of the class described, the combination with a shoe support movable to present a shoe in different positions, of an instep ironing mechanism arranged to operate upon the shoe in one position and a side ironing mechanism arranged to operate upon the shoe in another position.

84. In a machine of the class described, the combination with means for supporting a plurality of shoes, of an instep ironing mechanism arranged to operate upon one shoe in one position, and a side ironing mechanism arranged to operate simultaneously upon another shoe presented in another position.

85. In a machine of the class described, the combination with shoe supporting means, of an ironing mechanism for operating upon a shoe on said supporting means, another ironing mechanism arranged to operate upon another shoe simultaneously with the operation of said first named mechanism upon a shoe, and a common controlling means for rendering both said mechanisms operative upon their respective shoes.

86. In a machine of the class described, the combination with shoe supporting means, of an ironing mechanism for operating upon a shoe on said supporting means, another ironing mechanism arranged to operate upon another shoe simultaneously with the operation of said first named mechanism upon a shoe, and a common controlling means for rendering both said mechanisms operative upon their respective shoes, said controlling means being connected to one of said mechanisms to move it into operative relation to a shoe.

87. In a machine of the class described, the combination with shoe supporting means, of a plurality of ironing mechanisms arranged to operate respectively upon different portions of shoes on said supporting means, means for operating said mechanisms, manual means for moving one of said mechanisms into operative relation to a shoe, and means arranged to be controlled by said manual means for moving another of said mechanisms into operative relation to a shoe.

88. In a machine of the class described, the combination with shoe supporting means, of an ironing mechanism for operating upon a shoe on said supporting means, another ironing mechanism arranged to operate upon another shoe simultaneously with the operation of said first named mechanism upon a shoe, and means common to both said mechanisms for terminating automatically their operations upon the shoes.

89. In a machine of the class described, the combination with a shoe support, of a backstay ironing mechanism movable lengthwise of a shoe on said support into position to operate upon the shoe, an instep ironing mechanism movable in a direction transverse to the plane of the shoe bottom into position to operate upon the shoe, means for operating said mechanisms, and means for controlling the operative engagement of said mechanisms with the shoe.

90. In a machine of the class described, the combination with shoe supporting means, of instep and backstay ironing mechanisms arranged to operate simultaneously upon a shoe and movable into or out of position to engage a shoe in their operative movement, means for operating said mechanisms, and means common to both said mechanisms for controlling their movement into shoe engaging position.

91. In a machine of the class described, the combination with a shoe support, of instep and backstay ironing mechanisms movable into position to operate simultaneously upon a shoe on said support, means for operating said mechanisms, manual means for moving said mechanisms into operative relation to a shoe, and means for terminating automatically the operation of said mechanisms upon the shoe.

92. In a machine of the class described, the combination with a shoe support, of instep and backstay ironing mechanisms for operating simultaneously upon a shoe on said support, means for imparting operative movement to said mechanisms, and means for terminating the period of operative engagement of said mechanisms with the shoe without interrupting their operative movement.

93. In a machine of the class described, the combination with shoe supporting means, of instep and backstay ironing mechanisms, means for operating said mechanisms, supports upon which said mechanisms are mounted for swinging movement into or out of shoe engaging position, and means connecting said supports for simultaneous movements toward or from a shoe.

94. In a machine of the class described, the combination with a shoe support, of independent sets of ironing tools arranged to operate respectively upon the instep and the back of a shoe, rotatable carriers upon which said tools are mounted, means for rotating said carriers, and means for heating the tools.

95. In a machine of the class described, the combination with a shoe support, of independent sets of ironing tools arranged to operate respectively upon the instep and the back of a shoe, rotatable carriers upon which said tools are mounted, means for rotating said carriers, supports for said carriers movable toward or from the shoe, and yielding means arranged to operate upon said supports to hold the tools in operative relation to the shoe.

96. In a machine of the class described, the combination with a shoe support, of a plurality of ironing tools, a rotatable carrier upon which said tools are mounted, a support for said carrier movable to present the tools either in or out of position to operate upon a shoe, and means for rotating said carrier.

97. In a machine of the class described, a plurality of ironing tools for operating upon the upper of a shoe, a rotatable carrier upon which said tools are mounted for operative movement in a circular path, means for rotating said carrier, and shoe positioning means constructed and arranged to present a shoe in position for the upper to be ironed by said tools.

98. In a machine of the class described, the combination with a shoe support, of a plurality of ironing tools, a rotatable carrier upon which said tools are mounted, means for rotating said carrier, electrical heating units mounted on the carrier in position to heat the tools, slip rings rotatable with the carrier, electrical conductors connecting said slip rings to the heating units, and inlet and outlet terminals arranged to engage the respective slip rings.

99. In a machine of the class described, the combination with a shoe support, of a plurality of ironing tools, a rotatable carrier upon which said tools are mounted, means for rotating said carrier, electrical heating units mounted on the carrier in position to heat the tools, and means for supplying electrical current continuously to said heating units during the rotation of the carrier.

100. In a machine of the class described, the combination with a shoe support, of a plurality of upper ironing tools arranged to cause different tools to engage respectively different portions of a shoe on said support and to cause them collectively to iron an extended area of the upper of the shoe, means for moving said tools to cause them to operate upon the shoe, a plurality of electrical heating units associated with the respective tools and movable therewith, and means for supplying electrical current to said heating units for heating the tools.

101. In a machine of the class described, the combination with a shoe support, of independent sets of ironing tools arranged to operate respectively upon different parts of a shoe, carriers upon which said tools are mounted, means for imparting operative movement to said carriers, supports for said carriers movable toward or from a shoe, and yielding means arranged to operate upon said support to hold the tools in operative relation to the shoe.

102. In a machine of the class described, the combination with a shoe support, of a plurality of tools for operating upon the side of a shoe on said support, an endless carrier upon which said tools are mounted, and means for operating said carrier to move the tools lengthwise of the shoe, said carrier being mounted for movement about an axis extending lengthwise of the shoe to position the tools in or out of operative relation to the shoe.

103. In a machine of the class described, the combination with a shoe support, of a plurality of ironing tools for operating upon the side of a shoe on said support, an endless carrier upon which said tools are mounted, means for operating said carrier to move the tools lengthwise of the shoe, said carrier being movable to present the tools either in or out of position to engage a shoe in their operative movement, and power operated means for moving the carrier into shoe engaging position.

104. In a machine of the class described, the combination with a shoe support, of a plurality of ironing tools for operating upon the side of a shoe on said support, an endless carrier upon which said tools are mounted, means for operating said carrier to cause the tools to move lengthwise of the shoe, and means for heating the tools continuously during the movement of said carrier.

105. In a machine of the class described, the combination with a shoe support, of a plurality of tools for operating upon the side of a shoe on said support, an endless carrier upon which said tools are mounted, means for operating said carrier to cause the tools to traverse a shoe, and means for supporting said carrier against yielding movement in response to the pressure of the tools on the shoe.

106. In a machine of the class described, the combination with a shoe support, of a plurality of tools for operating upon a shoe on said support, an endless carrier upon which said tools are mounted, tool supports on said carrier comprising rods projecting endwise beyond the carrier, and means cooperating with the ends of said rods to guide the carrier during the operation of the tools upon the shoe.

107. In a machine of the class described, the combination with a shoe support, of a plurality of tools for operating upon a shoe on said support, an endless carrier upon which said tools are mounted, means for supporting said carrier against yielding movement in response to the pressure of the tools on the shoe, and means for supporting the tools on the carrier with provision for yielding movement of the tools in a direction transverse to the direction of their movement over the shoe.

108. In a machine of the class described, the combination with a shoe support, of ironing mechanisms for operating respectively upon the opposite sides of a shoe on said support, said mechanisms being mounted to swing into or out of operative relation to the shoe, and means for swinging said mechanisms comprising oppositely rotatable members and links connecting said members to the respective mechanisms.

109. In a machine of the class described, a plurality of tools for operating respectively upon the opposite sides of a shoe, means for moving said tools lengthwise of the shoe, guiding means for imparting to the tools a component of movement in the direction of the height of the shoe during their movement lengthwise of the shoe, means for presenting either a right or a left shoe in position to be operated upon by the tools, and means for adjusting said guiding means to cause the tools at the opposite sides of the shoe to move in different paths in accordance with whether the shoe presented is a right or a left.

110. In a machine of the class described, the combination with a shoe support, of tools for operating respectively upon the opposite sides of a shoe on said support, said tools and support being relatively movable into and out of operative working relation, means for moving said tools lengthwise of the shoe, guiding means for imparting to the tools a component of movement in the direction of the height of the shoe during their movement lengthwise of the shoe, and means operative as an incident to the relative movement of the tools and support into operative working relation for adjusting said guiding means to determine different paths of movement for the tools at the opposite sides of the shoe.

111. In a machine of the class described, the combination with ironing means, of a shoe support movable to carry a shoe into position to be operated upon by said ironing means, an expansible shoe tree on said support, and an expanding and locking device for the tree also carried by the shoe support, said device comprising an expanding member and a pivoted operating member having a portion arranged to bear against said expanding member to cause the expansion of the tree, said operating member being movable into such relation to said expanding member as to cause both members to be held by their interengagement in position to retain the tree in expanded condition.

112. In a machine of the class described, the combination with ironing means, of a shoe support movable to carry a shoe into position to be operated upon by said ironing means, an expansible shoe tree on said support, and an expanding and locking device for the tree also carried by the shoe support, said device comprising a lever connected to said tree to expand it and an operating lever having a portion arranged to engage the side of said expanding lever to effect the expansion of the tree, said operating lever being movable into such relation to the expanding lever as to cause both levers to be held by their interengagement in position to retain the tree in expanded condition while permitting free movement of the operating lever in the opposite direction to cause the contraction of the tree.

113. In a machine of the class described, the combination with ironing means, of a shoe support movable to carry a shoe into position to be operated upon by said ironing means, an expansible shoe tree on said support, and an expanding and locking device for the tree also carried by the shoe support, said device comprising a lever connected to said tree to expand it, an operating lever pivoted at one side of said expanding lever and having a portion arranged for sliding engagement with the expanding lever to effect the expansion of the tree, said operating lever being movable into such relation to the expanding lever as to cause both levers to be held by their interengagement in position to retain the tree in expanded condition, and means on the expanding lever for limiting the movement of said operating lever.

In testimony whereof I have signed my name to this specification in the presence of two subscribing witnesses.

JOHN S. HANSEN.

Witnesses:
R. M. PACKARD,
WILLIAM B. KING.

Copies of this patent may be obtained for five cents each, by addressing the "Commissioner of Patents, Washington, D. C."